US012390724B2

(12) United States Patent
Chintalapudi et al.

(10) Patent No.: US 12,390,724 B2
(45) Date of Patent: Aug. 19, 2025

(54) SYNCHRONIZING AUDIO STREAMS IN CLOUD-BASED GAMING ENVIRONMENT

(71) Applicant: Microsoft Technology Licensing, LLC, Redmond, WA (US)

(72) Inventors: Krishna Kant Chintalapudi, Bellevue, WA (US); Pouya Hamadanian, Cambridge, MA (US); Doug Gallatin, Kirkland, WA (US); Thomas Pouget-Abadie, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 290 days.

(21) Appl. No.: 18/171,926

(22) Filed: Feb. 21, 2023

(65) Prior Publication Data
US 2024/0278118 A1    Aug. 22, 2024

(51) Int. Cl.
*A63F 13/358*    (2014.01)
*A63F 13/215*    (2014.01)
(Continued)

(52) U.S. Cl.
CPC .......... *A63F 13/358* (2014.09); *A63F 13/215* (2014.09); *A63F 13/23* (2014.09);
(Continued)

(58) Field of Classification Search
CPC ...... A63F 13/215; A63F 13/23; A63F 13/355; A63F 13/358; A63F 13/54; G10L 19/018; G10L 19/167
See application file for complete search history.

(56) References Cited

U.S. PATENT DOCUMENTS 9,319,782 B1    4/2016  Crump
9,338,394 B2*   5/2016  Li ..................... H04L 12/1827
(Continued)

FOREIGN PATENT DOCUMENTS

EP    4080897 A1    10/2022
WO    2022056126 A1    3/2022

OTHER PUBLICATIONS

"The Xbox Adaptive Controller won't connect to my Xbox or Windows device", Retrieved From: https://support.xbox.com/en-US/help/account-profile/accessibility/adaptive-controller-wont-connect-to-xbox-or-pc, Aug. 15, 2022, 3 Pages.
(Continued)

*Primary Examiner* — William H McCulloch, Jr.
(74) *Attorney, Agent, or Firm* — NovoTechIP International PLLC

(57) ABSTRACT

A data processing system implements an acoustic delay detection technique for detecting and correcting inter-stream latency between two audio streams in a cloud-based computing environment. A first audio stream of game audio is sent to a controller or headset associated with the cloud-based computing environment, and a second audio steam of game audio is send to a display device associated with the cloud-based computing environment. An acoustic marker that is inaudible to human users is added to the second audio stream. A microphone associated with the controller or headset records audio content output by a speaker of the display device. The recording includes the acoustic marker. The gaming platform correlates this recording with the acoustic marker to determine a difference between the time that the controller played the audio and the time that the display device played the audio in order to determine and compensate for an inter-stream latency.

20 Claims, 19 Drawing Sheets

(51) Int. Cl.
  *A63F 13/23* (2014.01)
  *A63F 13/355* (2014.01)
  *A63F 13/54* (2014.01)
  *G10L 19/018* (2013.01)
  *G10L 19/16* (2013.01)

(52) U.S. Cl.
  CPC ............ *A63F 13/355* (2014.09); *A63F 13/54* (2014.09); *G10L 19/018* (2013.01); *G10L 19/167* (2013.01)

(56) References Cited

U.S. PATENT DOCUMENTS

| | | | |
|---|---|---|---|
| 9,952,309 B2* | 4/2018 | Davis | G01S 5/22 |
| 10,382,511 B2* | 8/2019 | Archambault | H04L 65/611 |
| 10,569,171 B2* | 2/2020 | Peterson | A63F 13/61 |
| 11,406,906 B2* | 8/2022 | Miura | A63F 13/63 |
| 11,532,312 B2* | 12/2022 | Khalil | G10L 19/167 |
| 11,538,485 B2* | 12/2022 | Huffman | G06N 3/088 |
| 11,564,003 B1* | 1/2023 | Lynch | H04N 21/44204 |
| 11,843,825 B2* | 12/2023 | Lynch | H04N 21/4398 |
| 11,929,076 B2* | 3/2024 | Khalil | G10L 15/08 |
| 11,985,494 B2* | 5/2024 | Pham | H04S 7/302 |
| 12,194,378 B2* | 1/2025 | Liu | A63F 13/847 |
| 2017/0099516 A1 | 4/2017 | Barbulescu | |
| 2019/0270019 A1* | 9/2019 | Miura | H04N 21/4781 |
| 2022/0020383 A1* | 1/2022 | Zhang | G10L 19/018 |
| 2023/0206377 A1* | 6/2023 | Kuznetsov | G10L 19/018 382/232 |
| 2023/0381640 A1* | 11/2023 | Tsytsarkin | A63F 13/27 |
| 2024/0221763 A1* | 7/2024 | Ginsburg | G10L 13/033 |
| 2024/0278118 A1* | 8/2024 | Chintalapudi | H04S 7/301 |

OTHER PUBLICATIONS

Haas, Helmut, "The influence of a single echo on the audibility of speech", In Journal of the Audio Engineering Society, vol. 20, Issue 2, Mar. 1, 1972, pp. 146-159.

Lezzoum, et al., "Echo Threshold Between Passive and Electro-Acoustic Transmission Paths In Digital Hearing Protection Devices", In Journal of International Journal of Industrial Ergonomics, vol. 53, May 1, 2016, pp. 372-329.

Litovsky, et al., "The Precedence Effect", In Journal of the Acoustical Society of America, vol. 106, Issue 4, Oct. 1999, pp. 1633-1654.

Pathak, et al., "A Measurement Study of Internet Delay Asymmetry", In Proceedings of International Conference on Passive and Active Network Measurement, Apr. 29, 2008, 10 Pages.

Schubert, et al., "Envelope versus microstructure in the fusion of dichotic signals", In Journal of the Acoustical Society of America, vol. 45, Issue 6, Jan. 31, 1969, pp. 1525-1531.

International Search Report and Written Opinion received for PCT Application No. PCT/US2024/015881, Jun. 4, 2024, 14 pages.

* cited by examiner

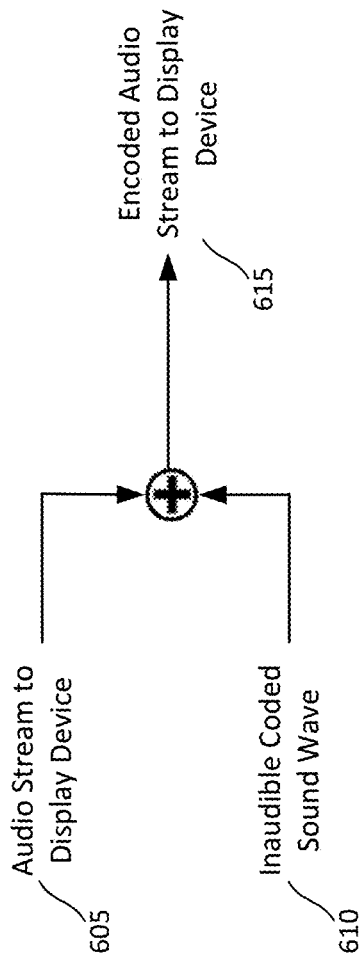

SYNCHRONIZING AUDIO STREAMS IN CLOUD-BASED GAMING ENVIRONMENT

BACKGROUND

Cloud-based gaming platforms enable users to play games that are stored and executed on remote servers rather than on hardware local to the users. The user typically has a controller and a display device located locally that are used to interact with the game content. The game audio and video are streamed to the display device. The audio content may also be streamed to the controller. The controller includes a microphone for capturing speech, voice commands, and/or other audio content from the user. In some implementations, the controller may be paired with a headset that includes earphones for playing audio content to the user and a microphone for capturing speech, voice commands, and/or other content from the user.

Synchronizing the multiple audio steams can present a challenge. The audio streams to and/from the controller and to the display device may take different network paths that can result in different of network latency being introduced into the audio streams. These differences in latency can result in echoes or other audio problems that can distract users and negatively impact the user experience. Hence, there is a need for improved systems and methods that provide a technical solution for synchronizing audio streams in a cloud-based gaming environment.

SUMMARY

An example data processing system according to the disclosure includes a processor and a machine-readable medium storing executable instructions. The instructions when executed cause the processor to perform operations including generating a first audio stream comprising audio content associated with a game being played on a cloud-based gaming platform, the cloud-based gaming platform being configured to execute the game on a server associated with the cloud-based gaming platform and to output audio and video streams comprising game content; generating a second audio stream comprising the audio content associated with the game being played and an acoustic marker inaudible to a human user; sending the first audio stream to a controller associated with the cloud-based gaming platform, the controller being associated with a first user, the controller providing a user interface for receiving control commands for the first user, the controller further configured to generate control signals based on the control commands and to send the control signals to the cloud-based gaming platform; sending the second audio stream to a display device associated with the first user, the display device comprising a display for presenting video content from video streams received from the cloud-based gaming platform, and a first speaker for presenting audio content from the encoded second audio stream; receiving a third audio stream from the controller, the third audio stream being generated based on signals output by a second microphone associated with the controller, the third audio stream including at least the acoustic marker of the second audio stream output by the first speaker of the display device captured by the second microphone; receiving timestamp information from the controller indicating when the controller outputs audio frames of the first audio stream via a second speaker associated with the controller; analyzing the third audio stream and the timestamp information to determine an inter-stream latency between the first audio stream and the second audio stream, the inter-stream latency representing a difference between latencies experienced by the first audio stream and the second audio stream; and adjusting one or more parameters of the first audio stream, the second audio stream, or both to reduce or eliminate the inter-stream latency to synchronize the playback of the first audio stream at the controller with the playback of the second audio stream at the display device.

An example data processing system according to the disclosure includes a processor and a machine-readable medium storing executable instructions. The instructions when executed cause the processor to perform operations including receiving a first audio stream at a controller associated with a cloud-based gaming platform, the first audio stream comprising audio content associated with a game being played on a cloud-based gaming platform; outputting the audio stream from a first speaker associated with the controller; generating timestamp information from the controller indicating when the controller outputs audio frames of the first audio stream via the first speaker; sending the timestamp information to cloud-based gaming platform; recording a second audio stream output by a second speaker associated with a display device, the second audio stream including an acoustic marker, the acoustic marker being inaudible to a human user; sending a third audio stream to the cloud-based gaming platform based on the recording of the second audio stream; and receiving a control signal from the cloud-based gaming platform to adjust a playback speed of the first audio stream to compensate for an inter-stream delay between the first audio stream and the second audio stream.

An example method implemented in a data processing system for synchronizing audio streams in a cloud-based gaming environment includes generating a first audio stream comprising audio content associated with a game being played on a cloud-based gaming platform, the cloud-based gaming platform being configured to execute the game on a server associated with the cloud-based gaming platform and to output audio and video streams comprising game content; generating a second audio stream comprising the audio content associated with the game; generating an encoded second audio stream from the second audio stream by adding an acoustic marker to the second audio stream, the acoustic marker being inaudible to a human user; sending the first audio stream to a controller associated with the cloud-based gaming platform, the controller being associated with a first user, the controller providing a user interface for receiving control commands for the first user, the controller further configured to generate control signals based on the control commands and to send the control signals to the cloud-based gaming platform; sending the encoded second audio stream to a display device associated with the first user, the display device comprising a display for presenting video content from video streams received from the cloud-based gaming platform, and a first speaker for presenting audio content from the encoded second audio stream; receiving a third audio stream from the controller, the third audio stream being generated based on signals output by a second microphone associated with the controller, the third audio stream including at least the acoustic marker of the second audio stream output by the first speaker of the display device captured by the second microphone; receiving timestamp information from the controller indicating when the controller outputs audio frames of the first audio stream via a second speaker associated with the controller; analyzing the third audio stream and the timestamp information to determine an inter-stream latency between the first audio stream and the second audio stream, the inter-stream latency representing a difference between latencies experienced by the first audio stream and the second audio stream; and adjusting one or more parameters of the first audio stream, the second audio stream, or both to reduce or eliminate the inter-stream latency to synchronize the playback of the first audio stream at the controller with the playback of the second audio stream at the display device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIGS. 6A-6C are diagrams show aspects of how the cloud-based gaming platform adds the acoustic markers to at least the audio stream sent to the display device shown in FIGS. 1A-1C.

DETAILED DESCRIPTION

Techniques for synchronizing audio streams in a cloud-based gaming environment are provided. The cloud-based gaming environment provides a gaming platform in which the software associated with one or more video games is stored and executed on servers of the cloud-based services. The gaming platform streams audio and video content to multiple endpoint devices local to the user, including display devices, controllers, and audio headsets. The controller is typically the primary input device through which the user interacts with a game implemented on the cloud-based gaming platform. The controller sends controls signals to the cloud-based gaming platform over a network connection and the cloud-based gaming platform interprets and responds to these signals by performing various actions within the game. The cloud-based gaming platform streams multiple content streams to the endpoint devices to implement the gaming experience for the user. These content streams include at least one video stream that is send to the display device of the user. These content streams also include multiple audio streams, which are transmitted to multiple endpoint devices including the display device, the controller, and/or headset of the user playing the game. The audio content transmitted to the display device may be included in a single stream with the video content in some implementations.

Synchronizing the playback of the multiple audio streams can quickly become a challenge. Each of the audio streams may take a different route over a network to the endpoint devices. Furthermore, the audio streams may be transmitted over different networks in some implementations. Network latency can cause these audio streams to become unsynchronized due to different paths taken over the same network or due to conditions on the different networks taken by the audio streams. Consequently, the user may experience echoes and/or other deficits in the audio quality as these audio streams are output by the endpoint devices.

The techniques herein provide a technical solution to the problem of synchronizing these audio streams by determining the network and other latency associated with the audio streams and adjusting the audio streams to compensate for the latency. A technical benefit of these techniques is that they provide a means for rapidly determining the latencies, which enables these tools to quickly respond to changing network conditions which impacts the latency of each of the audio streams. These and other technical benefits of the techniques disclosed herein will be evident from the discussion of the example implementations that follow.

Figure 1A:
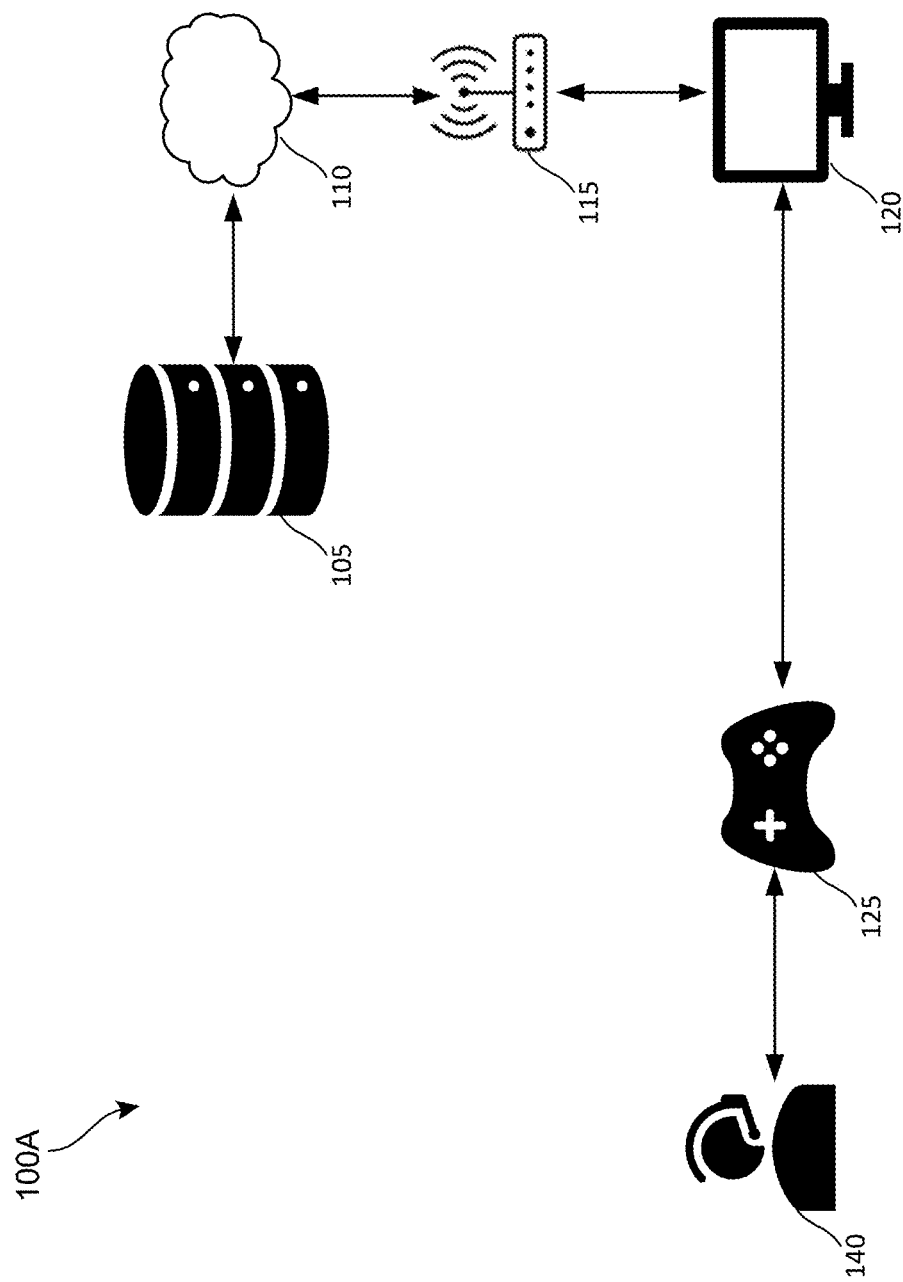
FIGS. 1A, 1B, and 1C are diagrams showing example computing environments in which the techniques disclosed herein for synchronizing audio streams may be implemented.
Figure 1B:
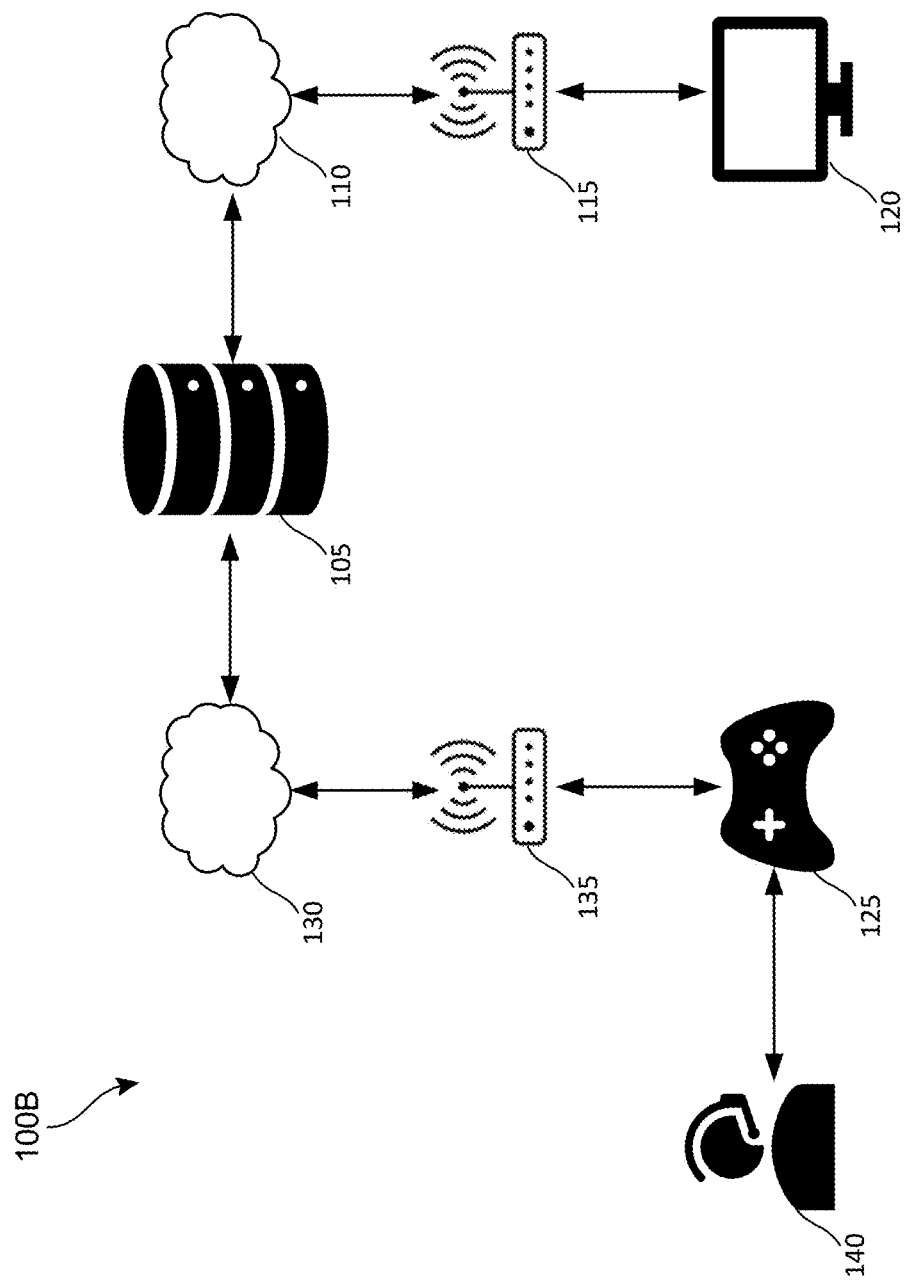
Figure 1C:
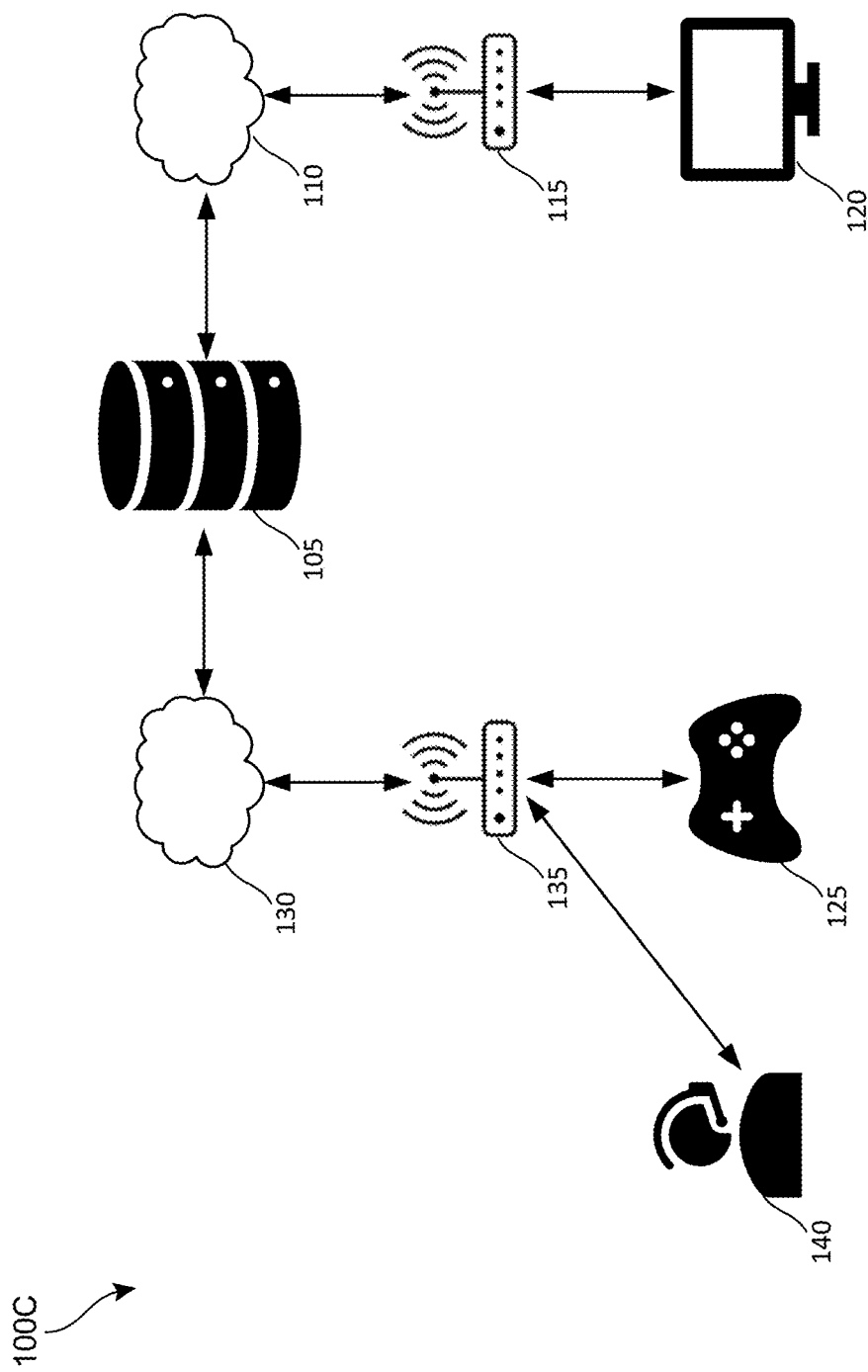

FIG. 1A is a diagram showing an example computing environment 100A that shows a typical implementation of a cloud-based gaming environment. However, the example implementations shown in FIGS. 1B and 1C are becoming more common as more endpoint devices, such as the controller 125 and the headset 140, are configured to communicated with the cloud-based gaming platform 105. The example shown in FIG. 1A does not experience the audio synchronization issues of the examples shown in FIGS. 1B and 1C, because the audio streams to the controller 125 and the display device 120 are transmitted over the same network in FIG. 1A. FIGS. 1B and 1C, which are discussed in detail below, provide examples in which multiple audio streams are transmitted separately to the display device 120, the controller 125, and/or the headset 140 which can result in synchronization problems as these audio streams experience different latencies.

The computing environment 100A includes a cloud-based gaming platform 105, a network 110, a wireless router 115, a display device 120, a controller 125, and a headset 140. The cloud-based gaming platform 105 is configured to store and execute video game content and to stream audio and video content to the display device 120, the controller 125, and the headset 140 via the network 110. The network 110 may be a combination of one or more public and/or private networks and may be implemented at least in part by the Internet.

The wireless access point 115 is disposed at the location at which the user accesses and plays the gaming content provided by the cloud-based gaming platform 105. The wireless access point 115 receives the content streams output by the cloud-based gaming platform 105 over the network 110. The wireless access point 115 provides the content streams from the cloud-based gaming platform 105 to the display device 120. The wireless access point 115 also streams audio content captured by a microphone of the headset 140 and/or a microphone of the controller 125 across the network 110 to the cloud-based gaming platform 105.

In the implementation shown in FIG. 1A, the display device 105 establishes a wireless connection with the wireless access point 115. The controller 125 establishes a wireless connection with the display device 120, and the headset establishes a wired or wireless connection with the controller 125. The wireless access point 115 is a Wi-Fi access point in some implements, and the display device 120 is configured to communicate with the wireless access point 115 using a Wi-Fi communication protocol. In some implementations, the controller 125 is configured to establish a Bluetooth® connection with the display device 120. Similarly, the headset 140 is configured to establish a Bluetooth® connection with the controller 125. In other implementations, the headset 140 is configured to connect with the controller 125 with a wired connection via an auxiliary jack or other connector on the controller 125.

The display device 120 does not need to download software or executed software for the games being played via the cloud-based gaming platform 105 or even be capable of executing such games. The display device 120 may be implemented by various types of devices capable of receiving and present audio and video streams from the cloud-based gaming platform 105. The cloud-based gaming platform 105 is configured to generate the audio and/or video content streams that include the game content and to send the content streams to the display device 120 for presentation to users playing and/or viewing the gameplay. In some implementations, the display deice 120 is a mobile phone, a tablet computer, a laptop computer, a netbook, a desktop computer, a game console, a smart television or connected television (CTV), a smart television stick configured to plug into an High-Definition Multimedia Interface (HDMI) port of a television or monitor, and/or other types of electronic device capable of outputting audio and/or video content received in the content streams from the cloud-based gaming platform 105. In some implementations, the display device 120 includes integrated speakers for outputting audio content. In other implementations, the display device 120 is connected to external speakers over a wired or wireless connection in other implementations. The display device 120 includes an integrated display in some implementations or is connected to an external display via a wired or wireless connection in some implementations.

The controller 125 provides a user interface for entering control commands for interacting with the games implemented on the cloud-based gaming platform 105. The controller 125 outputs control signals that are sent to the cloud-based gaming platform 105 for analysis. The cloud-based gaming platform 105 interprets and responds to these signals by performing various actions within the game. The controller 125 includes a microphone in some implementation that is capable of capturing audio content from the user. The microphone is used to facilitate a chat feature in which a user is able to speak with other players of a multiplayer game that are located remotely from the user in some implementations. The microphone is used to issue voice command which are interpreted by the cloud-based gaming platform 105 in other implementations. In some implementations, the controller 125 include a speaker for providing audio output. The audio output by the controller is substantially a duplicate of the game audio output by the display device 120 in some implementations. The controller 125 includes haptic feedback mechanisms for providing tactile feedback to the user in some implementations. The haptic feedback may be initiated by control signals transmitted by the cloud-based gaming platform 105. These control signals are embedded in an audio content stream provided by the cloud-based gaming platform 105 in some implementations.

The headset 140 is worn on the user's head and include earphones for outputting audio content and a microphone for capturing audio from the user. The microphone is used to facilitate a chat feature in which a user is able to chat with other players of a multiplayer game that are located remotely from the user in some implementations. The microphone is used to issue voice command which are interpreted by the cloud-based gaming platform 105 in other implementations.

FIG. 1B is a diagram showing an example computing environment 100B that shows another example of a cloud-based gaming environment in which the techniques herein may be implemented. In the example implementation shown in FIG. 1B, the controller 125 and the display 120 are both configured to receive audio streams from the cloud-based gaming platform 105 over a network connection. The controller 125 establishes a wireless connection with the access point 135, and the wireless access point 135 routes the content streams output by the cloud-based gaming platform 105 and streamed to the wireless access point 135 over the network 130. The wireless access point 135 also streams audio content captured by a microphone of the headset 140 and/or a microphone of the controller 125 across the network 110 to the cloud-based gaming platform 105.

In some implementations, the wireless access point 135 and the wireless access point 130 are separate wireless access points that are associated with different networks. In a non-limiting example, the wireless access point 115 is a Wi-Fi access point that is connected to a high-speed wired Internet connection and the wireless access point 130 is a smart phone that is configured to send and receive data over the a wireless network. The audio streams send by the cloud-based computing platform 105 to the controller 125 and the display device 120 take different routes over different networks that introduce different network latencies. In other implementations, the wireless access point 115 and the wireless access point 135 are connected to the same backhaul connection to the Internet, but the audio streams that are routed thorough each of the wireless access 115 and 130 points take different routes over the network between the wireless access points 115 and 130 and the cloud-based gaming platform 105. In yet other implementations, the controller 125 and the display device 120 are connected to the same wireless access point 110 or 130, but the audio streams sent by the cloud-based gaming platform 105 are routed across different paths across the network and experience different network latencies.

FIG. 1C is a diagram showing an example computing environment 100C that shows another example of a cloud-based gaming environment in which the techniques herein may be implemented. In the example shown in FIG. 1C, the headset 140 is connected to the wireless access point 135 and is configured to receive streamed audio content from the cloud-based gaming platform 105 and to stream audio content to the cloud-based gaming platform 105 without being connected through the controller 125. In such implementations, the audio streams transmitted to the headset 140, the controller 125, and the display device 120 may each experience different network latencies due to the audio streams being transported by different networks and/or different network paths.

The network latency for each of the audio streams in the preceding examples may change rapidly regardless which of these configurations is being utilized. The techniques provided herein provide a technical solution for determining the inter-stream delays and synchronizing the audio streams provided to the display device 120 and the controller 125 and/or the headset 140 to compensate for these inter-stream delays. The examples which follow provide details of how these techniques may be implemented.

Figure 1D:
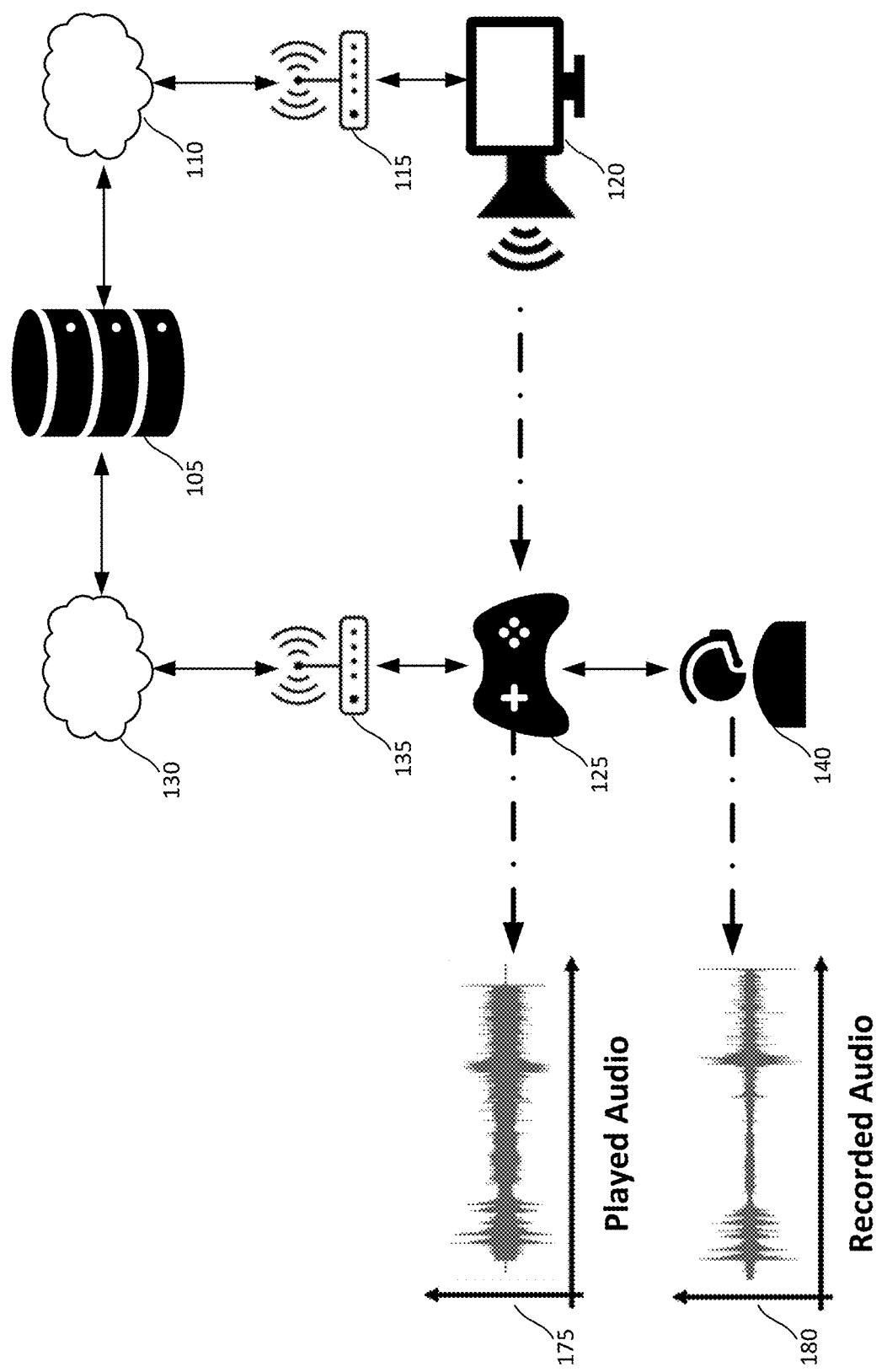
FIG. 1D is a diagram showing examples of audio content to be synchronized in an example computing environment similar to that shown in FIG. 1B.

FIG. 1D is a diagram showing examples of audio content to be synchronized in an implementation similar to that shown in FIG. 1B. The controller 125 and the display device 120 are located proximate to one another in the same room. The cloud-based gaming platform 105 sends a first audio stream that includes game audio to the controller 125 and a second audio stream that includes the game audio to the display device 120. Ideally, the playback of these two audio streams should be synchronized. Otherwise, the game audio output by the controller 125 (or the headset 140) and the display device 120 is out of synch and may result in echoes and/or other audio defects that negatively impact the user experience. The cloud-based gaming platform 105 attempts to minimize inter-stream delays so that the two audio streams are played back in a synchronized manner. In some implementations, the cloud-based gaming platform 105 attempts to eliminate the inter-stream delay or at least reduce the inter-stream delay below a target threshold. In some implementations, this target threshold is 30 milliseconds, which should result in the two audio streams being sufficiently synchronized to not be noticeable by a human user.

In the example shown in FIG. 1D, the controller 125 outputs the game audio content from the first audio stream and the display device 120 outputs game audio content from the second audios stream. The played audio 175 represents the game audio content output by the controller 175. The game audio content output by the speaker of the display device 120 should be substantially identical to the game audio content output by the controller 175. However, the inter-stream delay caused by different latencies experienced by the first and second audio streams may cause the playback of the first and second audio streams to become out of synch, which can result in echoes and other audio defects being experienced by the user playing the game.

The cloud-based gaming platform 105 remedies this problem through an acoustic delay detection technique in which the second audio stream to the display device 120 includes an acoustic marker as discussed above. The acoustic marker is inaudible to the user playing the game, but the microphone of the controller 125 and/or the headset 140 can detect and record the recorded audio content 180 which includes the acoustic markers. The microphone of the controller 125 and/or the headset 140 captures the recorded audio content 180, which may include voice commands and/or voice chat in some implementations. The microphone picks up at least a portion of the game audio output by the speaker of the display device 120 including the acoustic marker(s) that introduced into the second audio stream by the cloud-based gaming platform 105. The recorded audio content 180 is streamed to the cloud-based gaming platform 105 for processing. As will be discussed in the examples which follow, this recorded audio content 180 can be used to implement an acoustic delay detection technique that overcomes the technical problems associated with current techniques for detecting and correcting for differences in the latency between the audio streams. The acoustic delay techniques introduce an acoustic marker to the audio stream streamed to and played by the display device 120 to enable the cloud-based gaming platform 105 to determine and correct for an inter-stream delay associated with the audio streams sent to the controller 125 and the display device 120.

Figure 2:
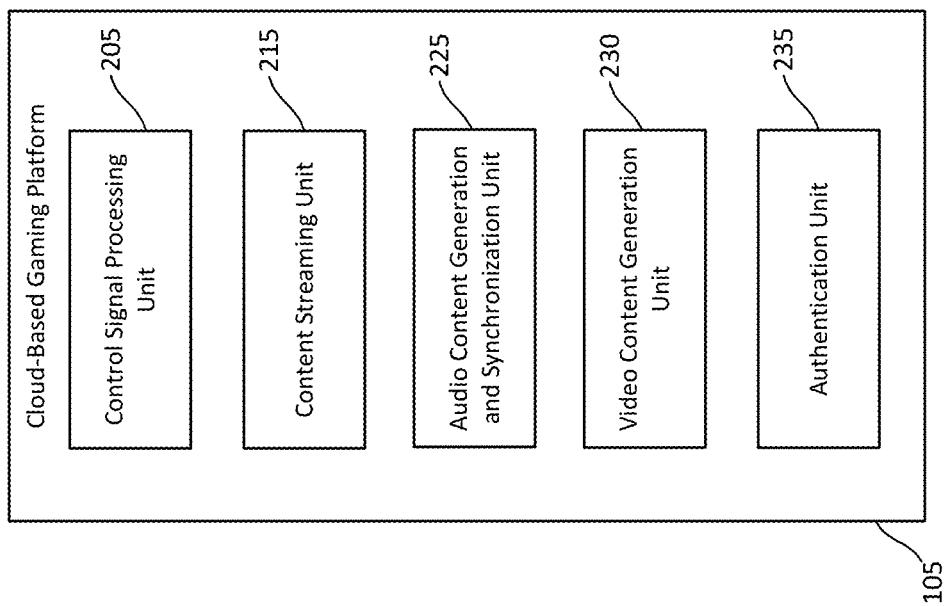
FIG. 2 is a diagram showing additional features of the cloud-based gaming platform shown in FIGS. 1A-1C.

FIG. 2 is a diagram showing additional features of the cloud-based gaming platform 105 shown in FIGS. 1A-1C. The cloud-based gaming platform 105 includes a control signal processing unit 205, a content streaming unit 215, an audio content generation and synchronization unit 225, a video content rendering unit 230, and an authentication unit 235. Implementations of the cloud-based gaming platform 105 may include additional functional units not shown in FIG. 2 in addition to or instead of one or more of the units of the cloud-based gaming platform 105 shown in FIG. 2.

The control signal processing unit 205 is configured to receive the control signals output by the controller 125. The cloud-based gaming platform 105 interprets and responds to these signals by performing actions within the game being played. In a multiplayer game, control signals may be received from multiple controllers associated with multiple users who are playing the game. The users participating in the multiplayer game may be located at the same location or at different locations. The control signal processing unit 205 provides the control signals from the user or users participating in a game and modifies a game state based at least in part on these control signals. The control signal processing unit 205 may provide the control signals to various components of the control-based gaming platform that are configured to maintain and update the game state based on the control signals, such as but not limited to a game engine configured to manage player-controlled characters and non-player controlled characters, physics engine, persistent storage for storing game assets and state information.

The content streaming unit 215 is configured to stream audio and video content generated by the cloud-based gaming platform 105 to the display device 120, the controller 125, and/or the headset 140 of the users participating in games implemented on the cloud-based gaming platform 105. The content streaming unit 215 is configured to send the audio streams generated by the audio content generation and synchronization unit 225 to the display device 120, the controller 125, and/or the headset 140 depending upon how the user has configured these devices. The content streaming unit 215 is configured to send the video streams generated by the video content generation unit 230 to the display device 120. The content streaming unit 215 accesses device information for each of the endpoint devices associated with each user playing a particular instance of a game implemented on the cloud-based gaming platform 105 and sends the audio and/or video streams to each of the endpoint devices.

The audio content generation and synchronization unit 225 is configured to generate audio streams for the cloud-based gaming platform 105 and to implement the techniques provided herein for synchronizing these audio streams on multiple endpoint devices, such as the display device 120, the controller 125, and the headset 140. The audio streams are generated for each endpoint device by the audio content generation and synchronization unit 225 based on the game state and/or actions occurring with the game. The audio content include but are not limited to ambient sounds, background music, dialog, and spot effects representing discrete events that have occurred within the game. The audio content may also include player generated chat in multiplayer games. As shown in the preceding examples, the player generated chat may be captured by a microphone of the controller 125 and/or the headset 140. The audio content generation and synchronization unit 225 is also configured to automatically handle the synchronization of these audio streams, which can result from the audio streams traversing between the cloud-based gaming platform 105 and the endpoint devices and/or the packets of the audio streams being routed along different routes to reach the endpoint devices. The audio content generation and synchronization unit 225 is configured to determine the differences in the latency between streams reaching the endpoint devices of a particular users and to compensate for this latency using acoustic delay detection techniques. These techniques are discussed in detail with respect to the examples shown in FIGS. 6A-8.

The audio content generation and synchronization unit 225 can use the techniques described in the examples which follow to determine an inter-stream delay (ISD) between a first audio stream to an endpoint device, such as the controller 125 or the headset 140, using an acoustic delay detection technique, and a second audio stream from the cloud-based gaming platform 105 to the display device 120 and. In some implementations, the audio content generation and synchronization unit 225 determines an estimated ISD. Once the audio content generation and synchronization unit 225 the delay or estimated delay, the audio content generation and synchronization unit 225 uses the delay information to adjust delays associated with one or more of the audio streams output by the cloud-based gaming platform 105 responsive to determining the ISD to synchronize the content streams. In instances in which the first audio stream is experiencing less latency than the first audio stream, the audio content generation and synchronization unit 225 delays the playback of the first audio stream at the controller 125 or the headset 140 by the ISD or the estimated ISD. In some implementations, the audio content generation and synchronization unit 225 slows down the playback of the first audio stream by the ISD and adjusts the pitch of the audio content accordingly. In other implementations, the audio content generation and synchronization unit 225 may selectively add silent frames to the second audio stream to provide an opportunity for the playback of the second audio stream to catch up to the playback of the first audio stream. In yet other implementations, the audio content generation and synchronization unit 225 may selectively speed up the second audio stream to the display device 120 and adjust the pitch of the audio content in order to eliminate or reduce the ISD. In other implementations, the audio content generation and synchronization unit 225 may selectively drop audio frames from the second audio stream to the display device 120. However, such adjustments to the second audio stream to the display device 120 may also require the video stream from the cloud-based gaming platform 105 to be modified. Consequently, the audio content generation and synchronization unit 225 may typically increase or reduce the delay associated with the first audio stream to the controller 125 to avoid having to manipulate the video stream of game content.

In instances in which the first audio stream has higher a latency than the second audio stream, the audio content generation and synchronization unit 225 speeds up the playback of the first audio stream at the controller 125 or the headset 140 by the ISD or the estimated ISD. In some implementations, the audio content generation and synchronization unit 225 speeds up the first audio stream by the ISD and adjusts the pitch of the audio content accordingly. In other implementations, the audio content generation and synchronization unit 225 may selectively drop frames of the first audio stream to provide an opportunity for the playback of the first audio stream to catch up to playback the second audio stream. Other implementation of the audio content generation and synchronization unit 225 may utilize other techniques for compensating for the ISD or estimated ISD.

In some implementations, the audio content generation and synchronization unit 225 sends control signals to the controller 125 to cause the controller 125 to adjust the playback of the first audio stream and/or the display device 120 to cause the display device 125 to adjust the playback of the second audio stream to compensate for the inter-stream delay. In such implementations, the control signals may indicate that the controller 125 or the display device 140 adjust the playback speed of the audio stream and adjust the pitch of the audio content accordingly. In other implementations, the control signals may indicate that the controller 125 or the display device 140 should add or drop audio frames from the audio stream to adjust the playback of the audio stream.

The video content generation unit 230 is configured to generate the graphical content of the game to be displayed on the display device 120. The video content generation unit 230 renders the graphical content representing the game state and generates a video stream based on the graphical content. The video stream includes graphical content that would typically be rendered locally on a game console or other computing device. The video stream sent to each user participating in a multiplayer game may be different. Each video stream may include a rendering from the point of view of each user in some implementations. The video streams generated by the video content generation unit 230 are provided to the content streaming unit for transmission to the various endpoint devices.

The authentication unit 235 is configured to authenticate users attempting to access the gaming content provided by the cloud-based gaming platform 105. The authentication unit 235 generate a user interface accessible from the display device 120 that permits the user to provide authentication credentials that the authentication unit 235 uses to determine that the user is permitted to access the content provided by the cloud-based gaming platform 105. The authentication unit 235 may store encrypted authentication credentials for the user in an authentication datastore of the cloud-based gaming platform 105.

Figure 3:
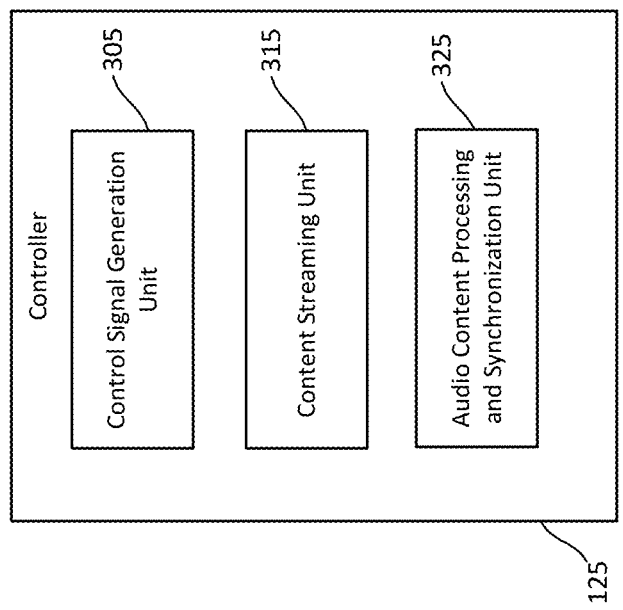
FIG. 3 is a diagram showing additional features of the controller shown in FIGS. 1A-1C.

FIG. 3 is a diagram showing additional features of the controller shown in FIGS. 1A-1C. The controller 125 includes a control signal generation unit 305, a content streamlining unit 315, an audio content processing and synchronization unit 325, and an audio content rendering unit 330. Implementations of the controller 125 may include additional functional units not shown in FIG. 3 in addition to or instead of one or more of the units of the controller 125 shown in FIG. 3.

The control signal generation unit 305 is configured to generate control signals to be sent to the cloud-based gaming platform 105. The controller 125 may include one or more buttons, analog joysticks, touchpads, directional pads, accelerometers, and/or other types of input elements that enable the user to provide inputs that are converted to control signals that are transmitted to the cloud-based gaming platform 105. The cloud-based gaming platform 105 analyzes these control signals and performs actions within the game being played.

The content streaming unit 315 is configured to receive audio streams from the cloud-based gaming platform 105 to be played through a speaker on the controller 125 and/or to output via the headset 140. The content streaming unit 315 is also configured to send an audio stream to the cloud-based gaming platform 105 that includes spoken content that may include chat content with other users and/or voice commands for causing the cloud-based gaming platform 105 to perform various actions. The spoken content is captured by a microphone of the controller 125 and/or the headset 140. The microphone may also be close enough to the speaker of the display device 120 to pick up the audio content output by the display device. As discussed in the preceding examples, the various audio streams may not be properly synchronized, and a latency difference greater than 40 ms can be perceived by humans and becomes distracting beyond 60 ms. In some implementations, the latency difference between the audio streams is detected and compensated for at the cloud-based gaming platform 105. In other implementations, the latency difference between the audio streams is detected and compensated for at the controller 125 by the audio content processing and synchronization unit 325.

The audio content processing and synchronization unit 325 is configured to generate audio streams from the audio content captured by the microphone of the controller 125 and/or the headset 140 to be sent to the cloud-based gaming platform 105. The audio content processing and synchronization unit 325 is configured implement the techniques provided herein for synchronizing these audio streams on multiple endpoint devices, such as the display device 120, the controller 125, and the headset 140 in some implementations. The audio content generation and synchronization unit 325 is configured to determine the differences in the latency between streams reaching the endpoint devices of a particular users and to compensate for this latency using acoustic delay detection techniques. These techniques are discussed in detail with respect to the examples shown in FIGS. 6-8.

Figure 4:
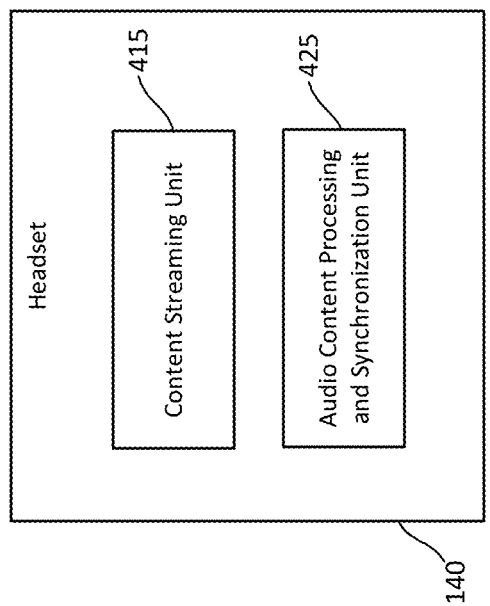
FIG. 4 is a diagram showing additional features of the headset shown in FIGS. 1A-1C.

FIG. 4 is a diagram showing additional features of the headset 140 shown in FIGS. 1A-1C. The headset 140 includes a content streaming unit 415, and an audio content processing and synchronization unit 425. Implementations of the headset 140 may include additional functional units not shown in FIG. 4 in addition to or instead of one or more of the units of the headset 140 shown in FIG. 4. The content streaming unit 415 of the headset is configured to operate similarly to the content streaming unit 315 of the controller 125. The audio content processing and synchronization unit 425 is configured to operate similarly to the audio content processing and synchronization unit 325 of the controller 125.

Figure 5:
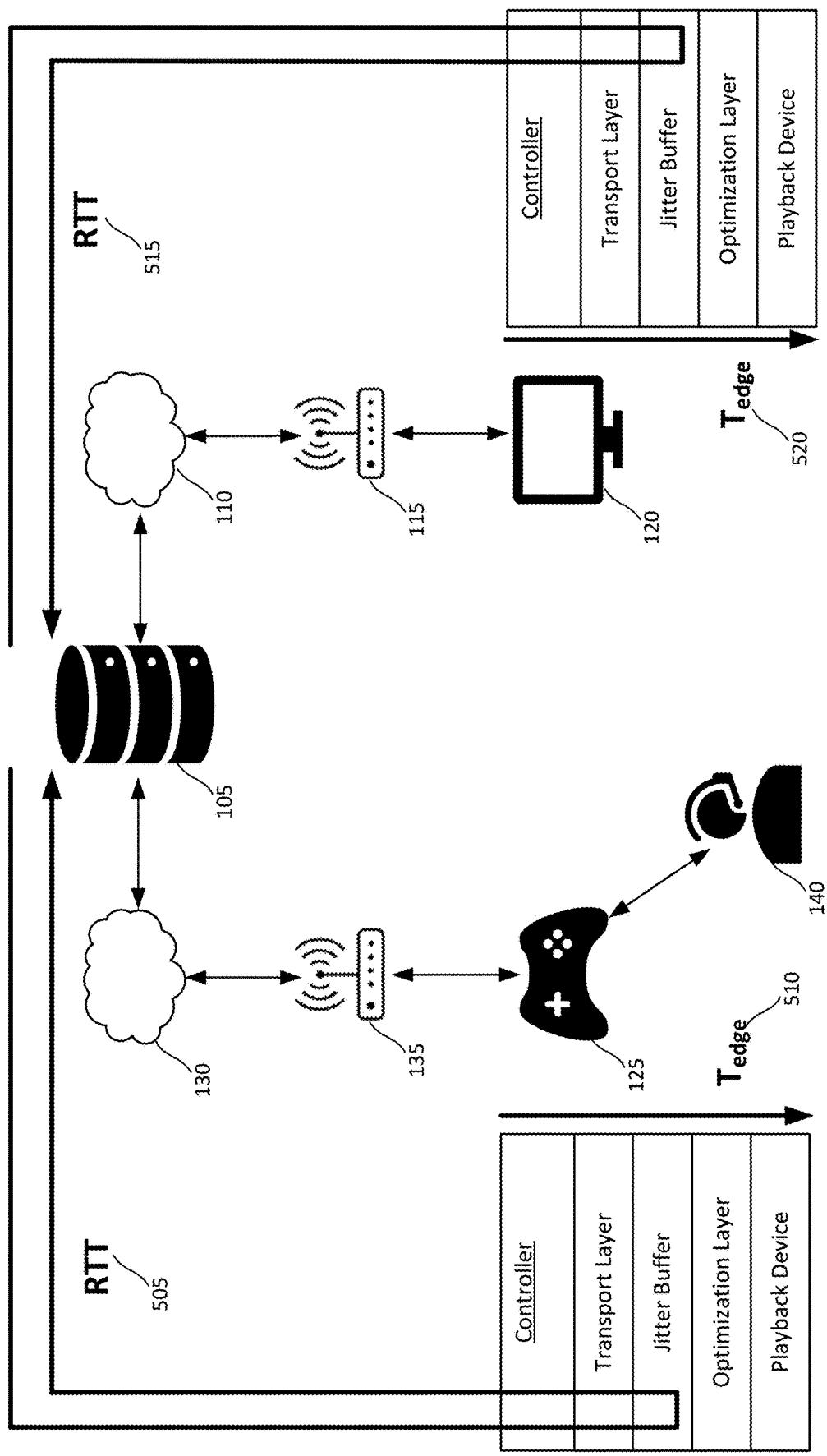
FIG. 5 is a diagram showing a technique for determining the difference in latencies between two audio streams.

FIG. 5 is a diagram showing a technique for determining the difference in latencies between two audio streams. The technique shown in FIG. 5 can be used to measure the Inter-Stream Delay (ISD) between two audio streams. In the example shown in FIG. 5, the ISD is measured between a first audio stream from the cloud-based gaming platform 105 to the controller 125 and a second audio stream from the cloud-based gaming platform 105 to the display device 120.

The ISD is determined by comparing the one-way latencies between of the two audio streams. The one-way latency for may be calculated using equation (1) below:

$$OWL = \frac{RTT}{2} + T_{edge}$$

where the RTT represents the round-trip time for a packet to travel from the cloud-based gaming platform 105 to endpoint device (the controller 125 or the display device 120) and back to the cloud-based gaming platform 105, and $T_{edge}$ represents latency introduced by the endpoint device.

The one-way latency for the first audio stream is calculated using the RTT 505 and the $T_{edge}$ 510. The one-way latency for the second audio stream is calculated using the RTT 515 and the $T_{edge}$ 520. The ISD is the difference between the one-way latency of the first audio stream and the second audio stream. The approach shown in FIG. 5 assumes that the RTT is symmetric. However, this assumption is often not true, and the latency is often asymmetric due to the dynamic nature of networks. Accordingly, the ISD technique typically used to measure differences in latency between two audio streams is not sufficiently accurate for determining the differences in latencies between two streams of audio data in a cloud-based gaming environment, such as those discussed in the preceding examples. FIGS. 6-8, which are described in detail in the examples which follow, show techniques which provide a technical solution to this problem by addressing the shortcomings of ISD and other such techniques commonly used to determine the latency in streaming content.

FIGS. 6A-6C and 7A-7C are diagrams of showing various aspects of acoustic delay detection techniques that may be implemented by the audio content generation and synchronization unit 225 of the cloud-based gaming platform 105. Prior to streaming the audio streams to the display device 120 and the controller 125 and/or the headset 140, the audio content generation and synchronization unit 225 adds an acoustic marker to at least the second audio stream sent to the display device 120. Adding the acoustic marker is discussed in greater detail with respect to FIGS. 6A-6C. The cloud-based gaming platform 105 also sends a first audio stream to another endpoint device, which is the controller 125 or the headset 140 depending upon the particular configuration of the computing environment being used.

The acoustic marker is included in the game audio in the second audio stream that is output by a speaker of the display device 120. The microphone of an endpoint device, the controller 125 and/or the headset 140, records the recorded audio content 180, which may include voice input from the user as well as the game audio including the acoustic marker that is output by the speaker of the display device 120. The endpoint device also receives the first audio stream that includes the game audio from the cloud-based gaming platform 105. The endpoint device captures a first set of timestamps that indicate when the endpoint device plays the content of the first audio stream and a second set of timestamps that indicate when the endpoint device records the recorded audio content 180. The first and second set of timestamps use the clock of the endpoint device as a reference. The first timestamp information includes an audio frame identifier for a frame of the game audio and a time at which the endpoint device played that frame of audio. The second timestamp information includes an audio frame identifier for the recorded audio content 180 and a time at which the endpoint device recorded the frame of audio. The recorded audio content 180 captured by the endpoint device includes the acoustic markers output by the speaker of the display device 120. By using timestamps that are based off of the clock reference of the endpoint device, the audio content generation and synchronization unit 225 of the cloud-based gaming platform 105 is able to determine the ISD between the first and second audio streams.

In a non-limiting example to illustrate these concepts, assume that the first and second audio streams include an audio frame 11223344. The audio content generation and synchronization unit 225 determines that the audio frame 11223344 was played at the headset 140 at reference clock time of 123456000 nanoseconds (ns). The audio content generation and synchronization unit 225 determines this based on the timestamp log information provided by the headset 140 in this example implementation. The audio content generation and synchronization unit 225 also determine that the audio frame 11223344 was heard at the headset 140 at reference clock time of 178456000 ns. The microphone of the headset records the audio output of the display device 120, which does not include the audio frame information. Consequently, the audio content generation and synchronization unit 225 determines that the audio frame 11223344 was heard at the headset 140 by identifying the acoustic marker(s) in the audio stream as discussed in the examples which follow. Once the ISD has been determined, the audio content generation and synchronization unit 225 can adjust delays associated with one or more of the audio streams and/or the video streams output by the cloud-based gaming platform 105 responsive to determining the ISD to synchronize the content streams. Additional details of how the audio content generation and synchronization unit 225 can adjust the delays are described in detail in the examples which follow.

Figure 6B:
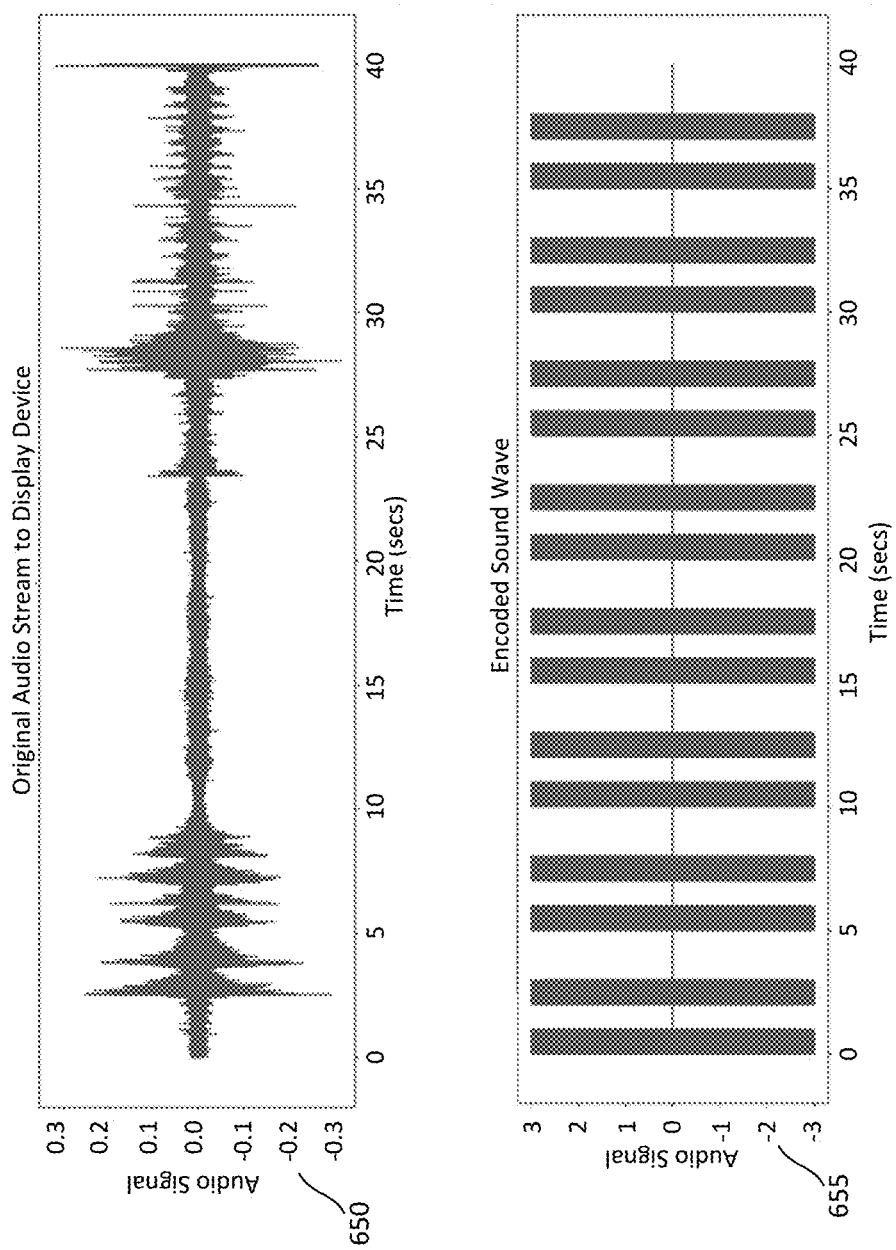
Figure 6C:
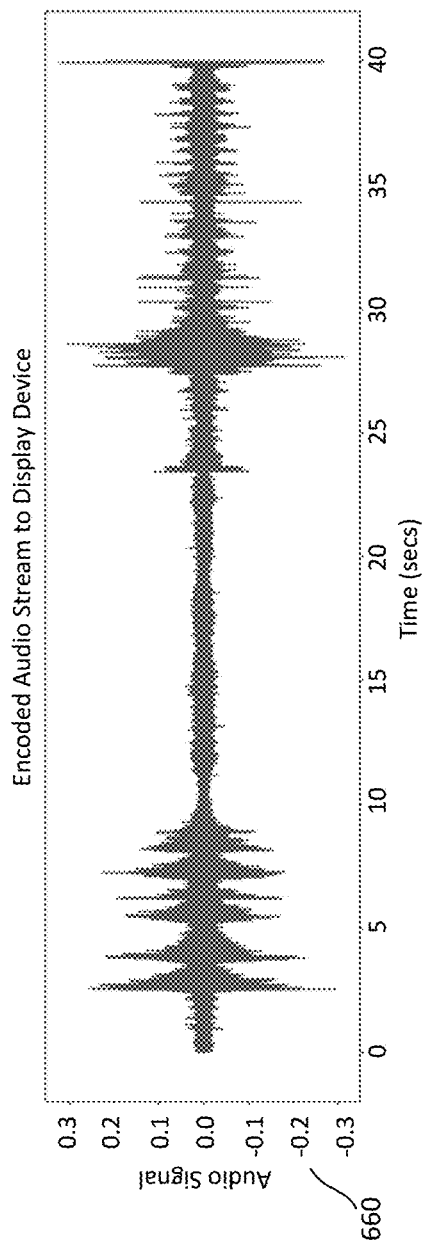

FIGS. 6A-6C are diagrams show aspects of how the audio content generation and synchronization unit 225 adds the acoustic markers to at least the audio stream sent to the display device 120. In some implementations, the audio content generation and synchronization unit 225 adds the acoustic marker adds an inaudible coded sound wave to the audio stream as the acoustic marker. The inaudible coded sound wave is intended not be audible to users listening the audio output by the display device 120, but the microphone of the controller 125 and/or the headset 140 is capable of detecting and recording this inaudible coded sound wave that has been added to the game audio being streamed to the display device 120.

FIG. 6A shows an example of how the encoding may be performed by the audio content generation and synchronization unit 225 of the cloud-based gaming platform 105. The audio content generation and synchronization unit 225 generates the audio stream 605 to be sent the display device 120 and combines this audio stream with an inaudible sound wave 610 to generate an encoded audio stream 615 to be sent to the display device 120. The audio stream 605 includes game audio content to be output by a speaker of the display device 120.

The inaudible sound wave 610 serves as an acoustic marker that is added to the audio stream 605. The acoustic marker is a low amplitude and quiet signal that that is easy to detect with a small amount of computation. In some implementations, the acoustic marker is white noise, as humans have evolved to not notice white noise even at higher amplitude. In other implementations, the acoustic marker is a chirp. A chirp is essentially a whistle that starts in bass frequencies and transitions to treble frequencies. Other types of acoustic marker may be used as long as the acoustic marker provides a sharp peak in the autocorrelation function used to detect the acoustic marker in the audio stream received at the cloud-based gaming platform 105 from the controller 125 and/or the speaker 140.

FIG. 6B provide an example of an original audio stream 650 to be sent to the display device 120 and an example encoded sound wave 655 to be added to the original audio stream 650. FIG. 6C shows an example of an encoded audio stream 660 that represents the combination of the original audio stream 650 with the encoded sound wave 655. The encoded sound wave 655 includes a repeating series of pulses in a known pattern. These pulses are intended to be inaudible to human users when the encoded audio stream is output by a speaker of the display device 120. However, the microphone of the controller 125 and/or the headset 140 are capable of detecting the repeating sound wave in the audio content captured by the microphone. The pattern of pulses of the encoded sound wave 655 are repeated periodically in some implementations. The specific pattern of pulses utilized may vary from implementation to implementation. As will be discussed in the examples which follow, the position of the pulses of the encoded sound wave 655 included in the encoded sound wave 655 are known, and the time that these are recorded by the microphone of controller 125 and/or the headset 140.

Figure 7A:
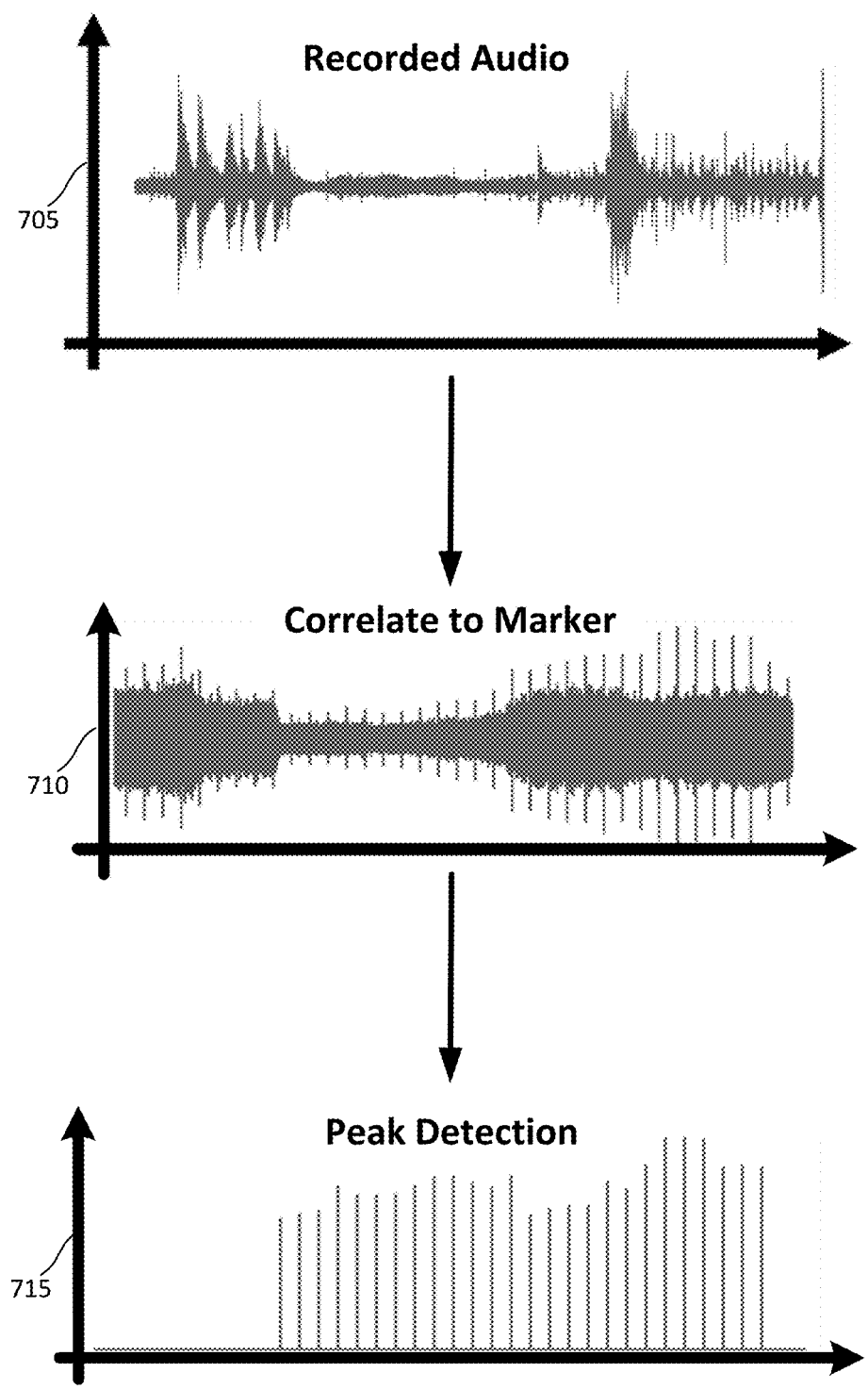
FIGS. 7A-7C are diagrams showing additional details of how the cloud-based gaming platform performs the acoustic delay detection by detecting the acoustic markers in the recorded audio captured by the microphone of the controller or the headset.
Figure 7B:
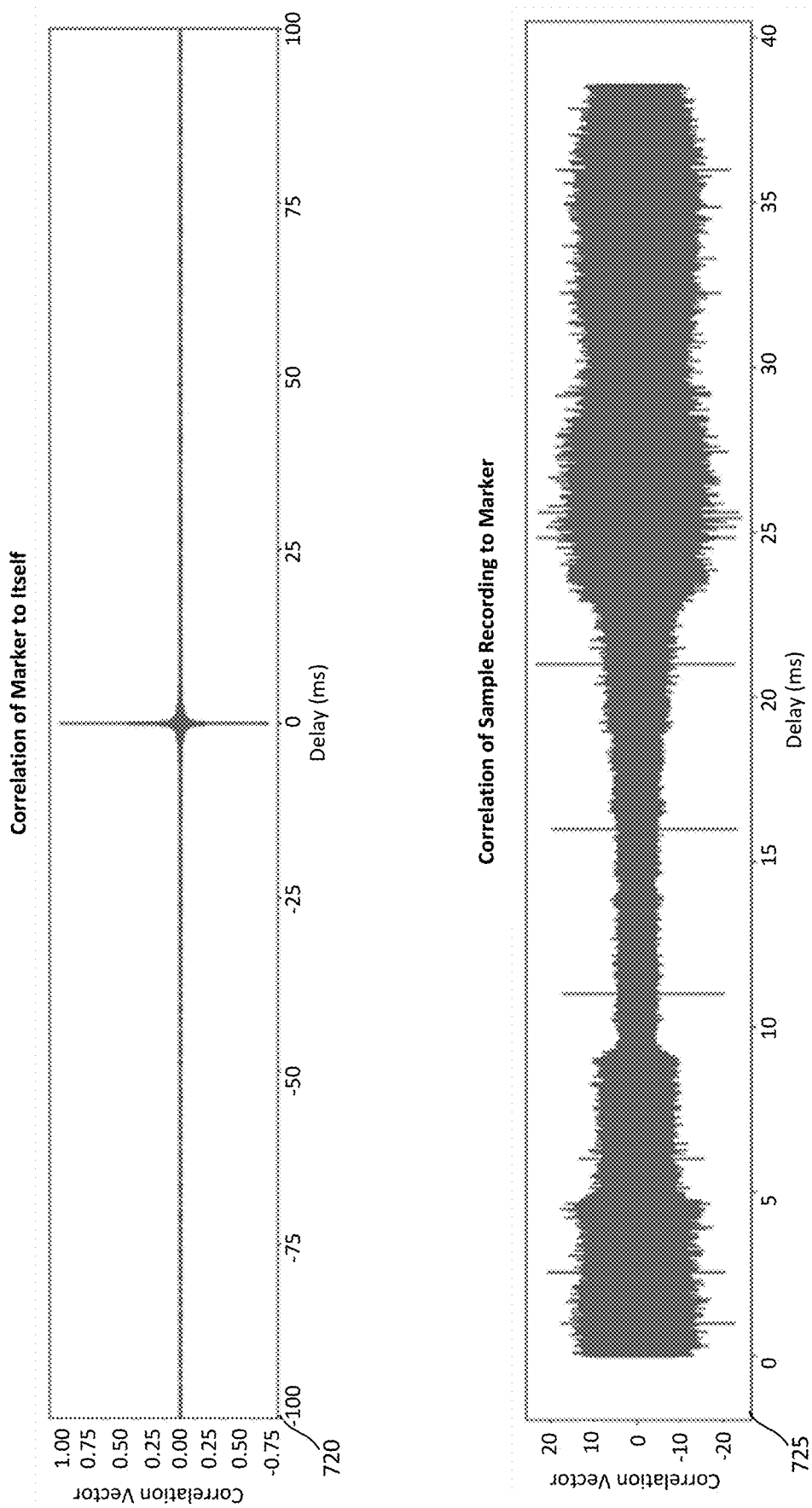
Figure 7C:
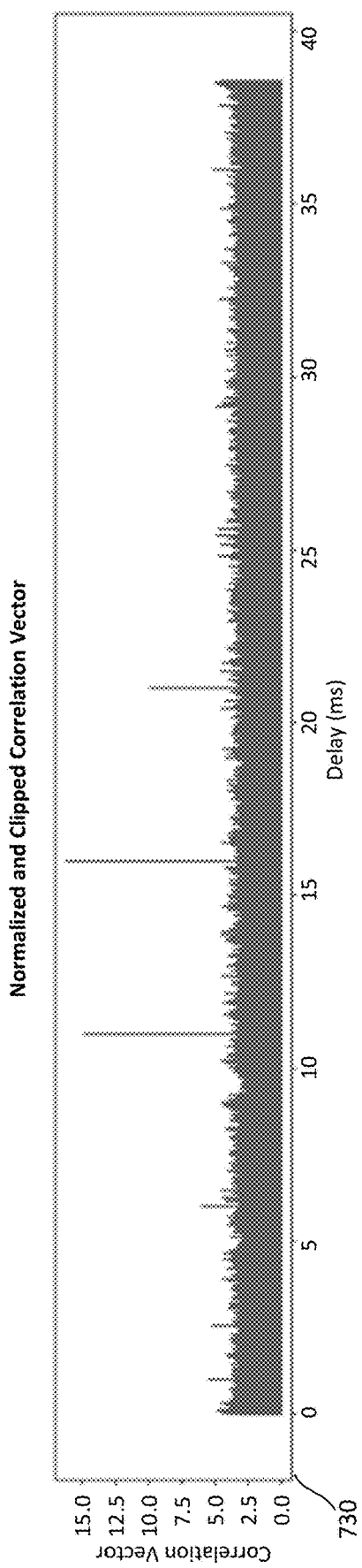
Figure 8:
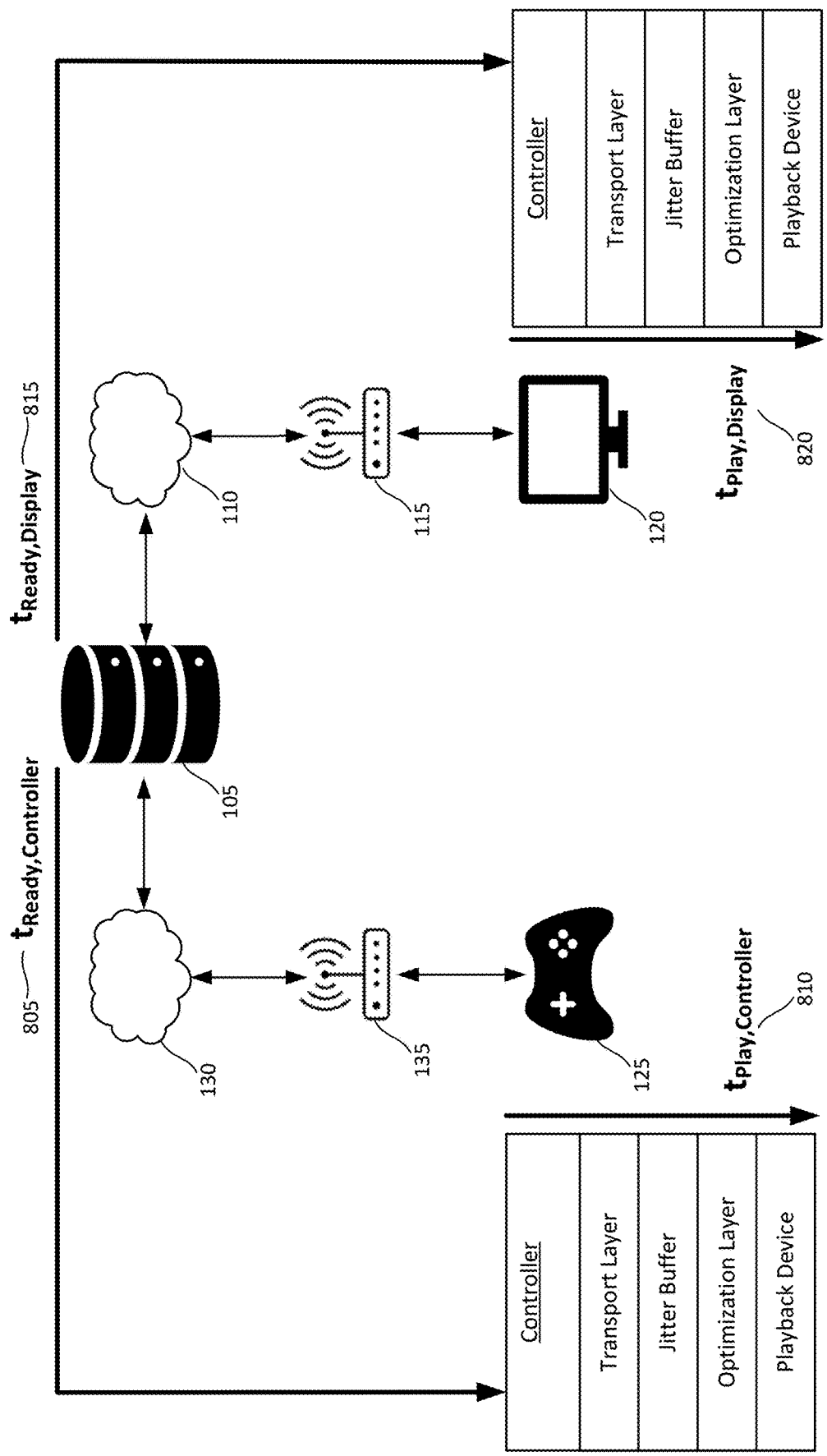
FIG. 8 is a diagram showing another acoustic detection technique for determining the difference in latencies between two audio streams.

FIGS. 7A-7C are diagrams showing additional details of how the audio content generation and synchronization unit 225 performs the acoustic delay detection by detecting the acoustic marker(s) in the recorded audio 180 captured by the microphone of the controller 125 or the headset 140. FIG. 7A shows steps that the audio content generation and synchronization unit 225 of the cloud-based gaming platform 105 performs to detect the differences in the latency between the audio streams transmitted to the controller 125 and the display device 120 in some implementations. The recorded audio 705 captured by the microphone of the controller 125 or the headset 140 and is sent to the cloud-based gaming platform 105 as discussed in the preceding examples. The recorded audio 705 is a stream that includes the voice input captured by the microphone as well as detecting audio output by a speaker of the display device 120. As indicated in the preceding examples, the audio output by the speaker of the display device 120 includes the pattern of pulses that can be detected by the audio content generation and synchronization unit 225. The audio content generation and synchronization unit 225 performs autocorrelation in which a signal is correlated with a copy of itself as a function of the delay. In this case, the audio content generation and synchronization unit 225 correlates the acoustic market introduced into the audio stream sent to the display device 120 with the recorded audio 705. The diagram 710 represents the autocorrelation step in which the recorded audio 705 is correlated with the acoustic marker. Finally, the diagram 715 represents peak detection. A sharp peak is observed where the filter (the acoustic marker) and the input (the recorded audio 705) align. FIG. 7B includes a first diagram 720 that provides an example of a sharp peak resulting from correlation of the acoustic marker with itself. FIG. 7B includes a second diagram 725 that provides examples of peaks resulting from the correlation of an example recording, such as the record audio 705 correlated with the acoustic marker. However, the peaks observed in the signal shown in the second diagram 725 FIG. 7C includes a third diagram 730 that provides an example of normalized and clipped data to emphasize the peaks. The specific normalization and clipping techniques utilized may vary from implementation to implementation. Some implementations do not include normalization or clipping operations.

Each of the peaks may be associated with a timestamp indicating the position of the peak relative to the audio stream. The timestamp may be expressed in terms of the clock value at the controller 125 at the time that each audio frame of the recorded audio content was recorded. The audio content generation and synchronization unit 225 compares the time at which the corresponding audio frame was played in the played audio 175 to determine the inter-stream delay between the first and second audio streams. The audio content generation and synchronization unit 225 then adjusts one or more parameters of the first and/or second audio streams to delay or speed up the playback of the audio stream in order to compensate for the inter-stream delay and to synchronize the playback of the two audio streams.

FIG. 8 is a diagram showing another acoustic detection technique for determining the difference in latencies between two audio streams. The technique shown in FIG. 8 is a method that can be used to reduce the frequency at which the audio content generation and synchronization unit 225 determines the ISD as in the preceding examples. As discussed above, the audio content generation and synchronization unit 225 may periodically redetermine the ISD due to changing network conditions. In contrast, the technique shown in FIG. 8 is referred to as a "You Only Measure Once" (YOMO) approach to synchronizing the audio streams to the display device 120 and the controller 125 and/or the headset 140. The cloud-based gaming platform 105, the endpoint device (controller 125 or the headset 140), and the display device 120 each have separate clocks that are not synchronized.

The YOMO process shown in FIG. 8 utilize the clock of the cloud-based gaming platform 105 as the reference. In this example, the endpoint device is the controller 125. However, this technique could also be applied to determine the clock offset for the clock of the headset 140 in other implementations. The YOMO process determines a one-way latency estimate for an audio stream based upon a first timestamp record when a respective audio frame is transmitted to the endpoint device and a second timestamp when the endpoint device plays the respective audio frame.

The clock of the controller 125 has a clock offset of $TO_{controller}$ and the clock of the display device 120 has a clock offset of $TO_{display}$. The audio content generation and synchronization unit 225 logs a first timestamp when an audio frame is given to the cloud-based gaming platform's server stack for the controller 125 ($t_{ready,controller}$ 805), and a second timestamp when an audio frame is given to the cloud-based gaming platform's server stack for the display device 120 ($t_{ready,display}$ 815). A third timestamp is logged when the audio frame is scheduled for playback in stack of the controller 125 ($t_{play,controller}$ 810), and a fourth timestamp is logged when the audio frame is scheduled for playback in stack of the display device 120 ($t_{play,display}$ 820). Accordingly, the one-way latency (OWL) estimates for the audio streams to the controller 125 and the display device 120 can be represented by:

$$OWL_{controller} = t_{play,controller} - t_{ready,controller}$$

$$OWL_{display} = t_{play,display} - t_{ready,display}$$

These two one-way latency estimates can be used to determine an estimated ISD ($\widehat{ISD}$) for the first and second audio streams.

$$\widehat{ISD} = (t_{play,controller} - t_{ready,controller}) - (t_{play,display} - t_{ready,display})$$

However, the estimated ISD includes a substantial error primarily due to the time offsets associated with the paths taken by the two audio streams. The error can be represented as:

$$\text{Error} = ISD - \widehat{ISD}$$

Where the largest terms in the error are the clock offsets $TO_{controller}$ between the reference clock of the cloud-based gaming platform 105 and the clock of the controller 125, and the clock offset $TO_{display}$ between the reference clock of the cloud-based gaming platform 105 and the clock of the display device 120. These time offsets may be as high as hundreds of milliseconds in some implementations. Furthermore, the propagation delays along the respective paths taken by each of the audio streams may introduce delays of tens of milliseconds in some implementations. However, it is important to note that the error offset represented by the fixed error term determined above does not change over time given that there is no substantial clock drift of any of the clocks involved. Consequently, if a single accurate measurement of the ISD can be obtained using the methods described in the preceding examples, the fixed error term can be determined and can be added to further measurements of the $\widehat{ISD}$ to obtain a reasonably accurate estimate of the ISD. In some implementations, the audio content generation and synchronization unit 225 determines an accurate ISD using the techniques from the preceding examples every N minutes (or other unit of time) and then uses the $\widehat{ISD}$+error to estimate the ISD in between determinations of the accurate ISD. A technical benefit of this approach is that the time to determine the ISD can be reduced and the computation and network resources associated with determining the estimated ISD are less than those required to determine the accurate ISD.

Figure 9A:
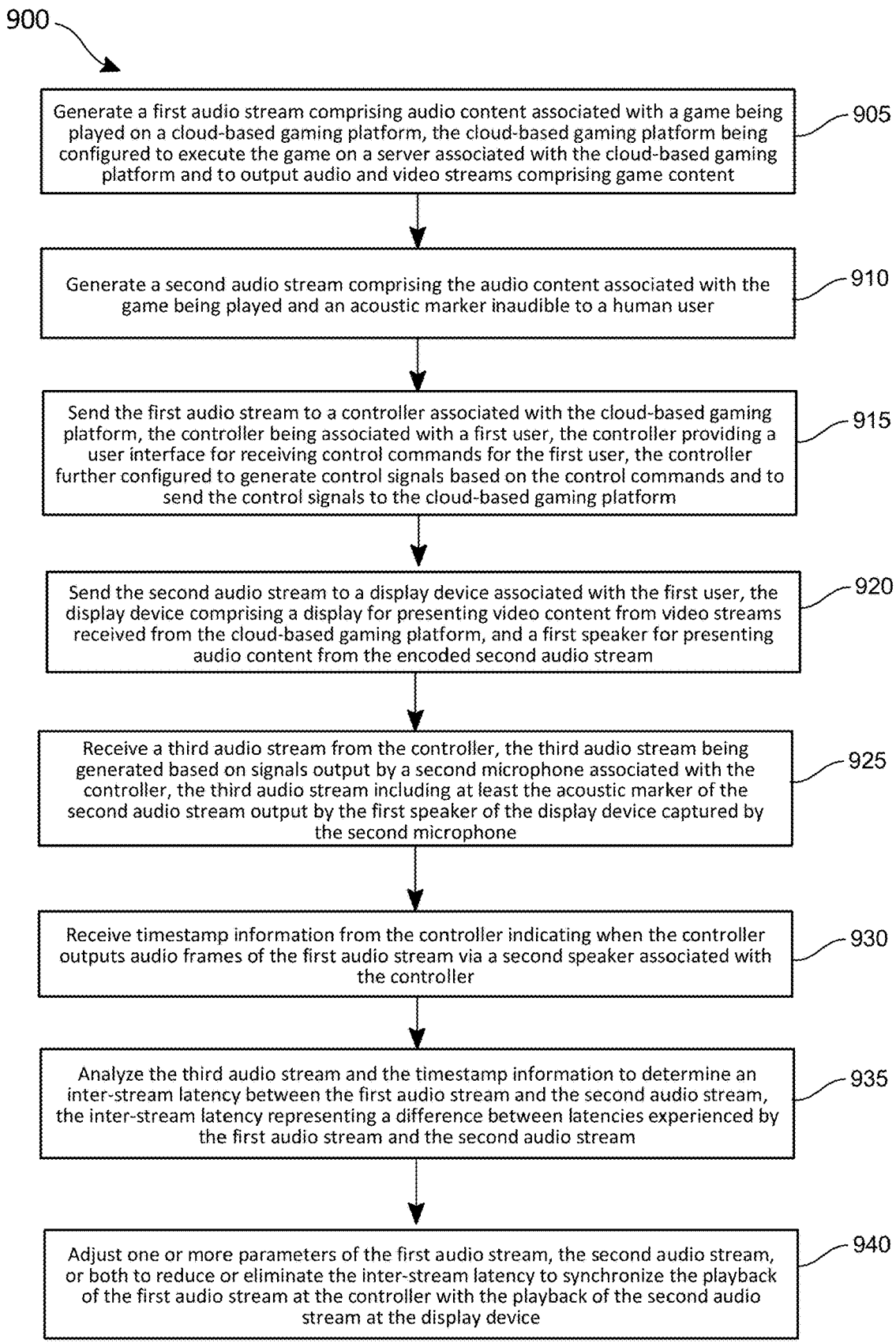
FIG. 9A is an example flow chart of an example process for synchronizing multiple audio content streams.

FIG. 9A is an example flow chart of an example process 900 for synchronizing multiple audio content streams. In some implementations, the process 900 is implemented by the audio content generation and synchronization unit 225 of the cloud-based gaming platform 105.

The process 900 includes an operation 905 of generating a first audio stream comprising audio content associated with a game being played on a cloud-based gaming platform, the cloud-based gaming platform being configured to execute the game on a server associated with the cloud-based gaming platform and to output audio and video streams comprising game content. The cloud-based gaming platform 105 is configured to execute the game on a server associated with the cloud-based gaming platform and to output audio and video streams comprising game content The process 900 includes an operation 910 generating a second audio stream comprising the audio content associated with the game being played and an acoustic marker inaudible to a human user. As discussed in the preceding examples, the acoustic marker is added to the audio stream being sent to the display device 120. The acoustic marker is intended to be inaudible to human users listening to the audio output of the speaker of the display device 120, but the microphone of the controller 125 and/or the headset 140 is capable of sensing and capturing the acoustic marker in the audio output.

The process 900 includes an operation 915 of sending the first audio stream to a controller associated with the cloud-based gaming platform. The controller is associated with a first user, the controller 125 providing a user interface for receiving control commands for the first user, the controller further configured to generate control signals based on the control commands and to send the control signals to the cloud-based gaming platform.

The process 900 includes an operation 920 of sending the second audio stream to a display device associated with the first user. The display device 120 includes a display for presenting video content from video streams received from the cloud-based gaming platform, and a first speaker for presenting audio content from the encoded second audio stream. The controller 125 and the display device 120 are located proximate to each other, such as in a same room in which the user playing the game is disposed.

The process 900 includes an operation 925 of receiving a third audio stream from the controller. The third audio stream, which represents the recorded audio 180, is generated based on signals output by a second microphone associated with the controller 125. The third audio stream includes at least the acoustic marker of the second audio stream output by the first speaker of the display device captured by the second microphone.

The process 900 includes an operation 930 of receiving timestamp information from the controller indicating when the controller outputs audio frames of the first audio stream via a second speaker associated with the controller. As discussed in the preceding examples, the controller 125 is configured to capture timestamp information as the first audio content is played on a speaker associated with the controller 125 or on the headset 140 associated with the controller 125.

The process 900 includes an operation 935 of analyzing the third audio stream and the timestamp information to determine an inter-stream latency between the first audio stream and the second audio stream. The inter-stream latency represents a difference between latencies experienced by the first audio stream and the second audio stream as discussed in the preceding examples.

The process 900 includes an operation 940 of adjusting one or more parameters of the first audio stream, the second audio stream, or both to reduce or eliminate the inter-stream latency to synchronize the playback of the first audio stream at the controller with the playback of the second audio stream at the display device. As discussed above, the audio content generation and synchronization unit 225 of the cloud-based gaming platform 105 can speed up or slow down the playback of the audio streams to reduce the inter-stream latency below an acceptable threshold or eliminate the inter-stream latency.

Figure 9B:
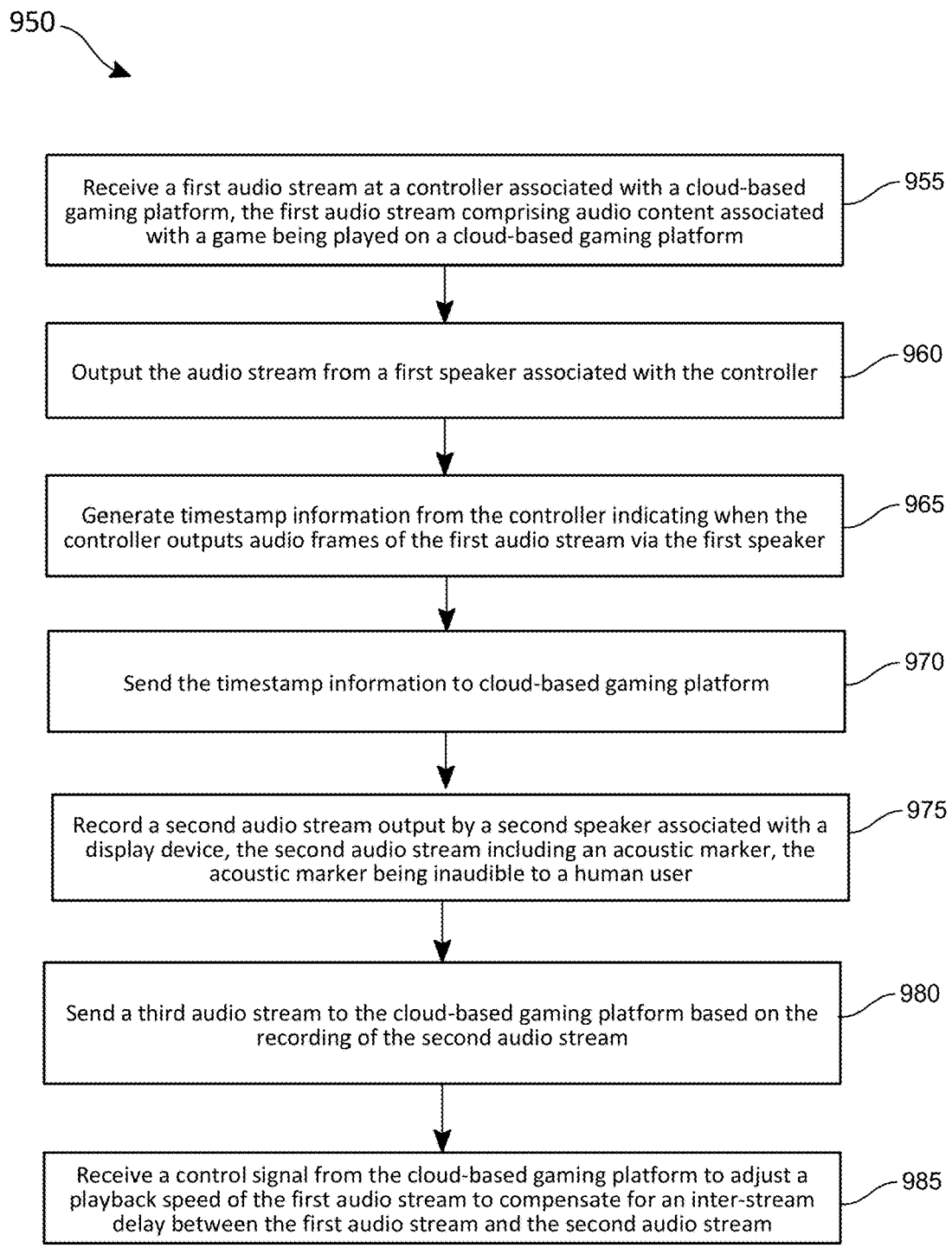
FIG. 9B is an example flow chart of another example process for synchronizing multiple audio content streams.

FIG. 9B is an example flow chart of an example process 950 for synchronizing multiple audio content streams. In some implementations, the process 900 is implemented by the controller 125 or the headset 140.

The process 950 includes an operation 955 of receiving a first audio stream at the controller 125 associated with the cloud-based gaming platform 105. The first audio stream includes audio content associated with a game being played on a cloud-based gaming platform. As discussed in the preceding examples, the cloud-based gaming platform streams game audio the display device 120 and the controller 125 or the headset 140.

The process 950 includes an operation 960 of outputting the audio stream from a first speaker associated with the controller and an operation 965 of generating timestamp information from the controller indicating when the controller outputs audio frames of the first audio stream via the first speaker. The process 950 includes an operation 979 of sending the timestamp information to cloud-based gaming platform The controller 125 captures a first set of timestamps that indicate when the controller 125 plays the content of the second audio stream and sends the timestamps information to the cloud-based gaming platform 105 for analysis.

The process 950 includes an operation 975 of recording a second audio stream output by a second speaker associated with a display device. The second audio stream including an acoustic marker, the acoustic marker being inaudible to a human user. The speaker of the display device 120 outputs the audio signal based on the second audio stream received by the display device 120. Both the first and second audio streams include game audio, but the playback of the two audio streams can become unsynchronized due to the various latency issues discussed in the preceding examples. The controller 125 records the second audio stream so that the stream can be analyzed to determine the inter-stream latency between the first and second audio streams.

The process 950 includes an operation 980 of sending a third audio stream to the cloud-based gaming platform based on the recording of the second audio stream. The controller generates an audio stream that includes the audio recorded by the microphone associated with the controller 125 and sends the third auto stream to the cloud-based gaming platform 105 for analysis using the acoustic delay determination techniques provided herein.

The process 950 includes an operation 985 of receiving a control signal from the cloud-based gaming platform to adjust a playback speed of the first audio stream to compensate for an inter-stream delay between the first audio stream and the second audio stream. In some implementations, the audio content generation and synchronization unit 225 of the cloud-based gaming platform 105 is configured to send control signals to the controller 125 that cause the controller 125 to adjust the playback speed of the first audio content in order to compensate for the inter-stream delay between the first and second audio streams.

The detailed examples of systems, devices, and techniques described in connection with FIGS. 1A-9B are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1A-9B are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 10:
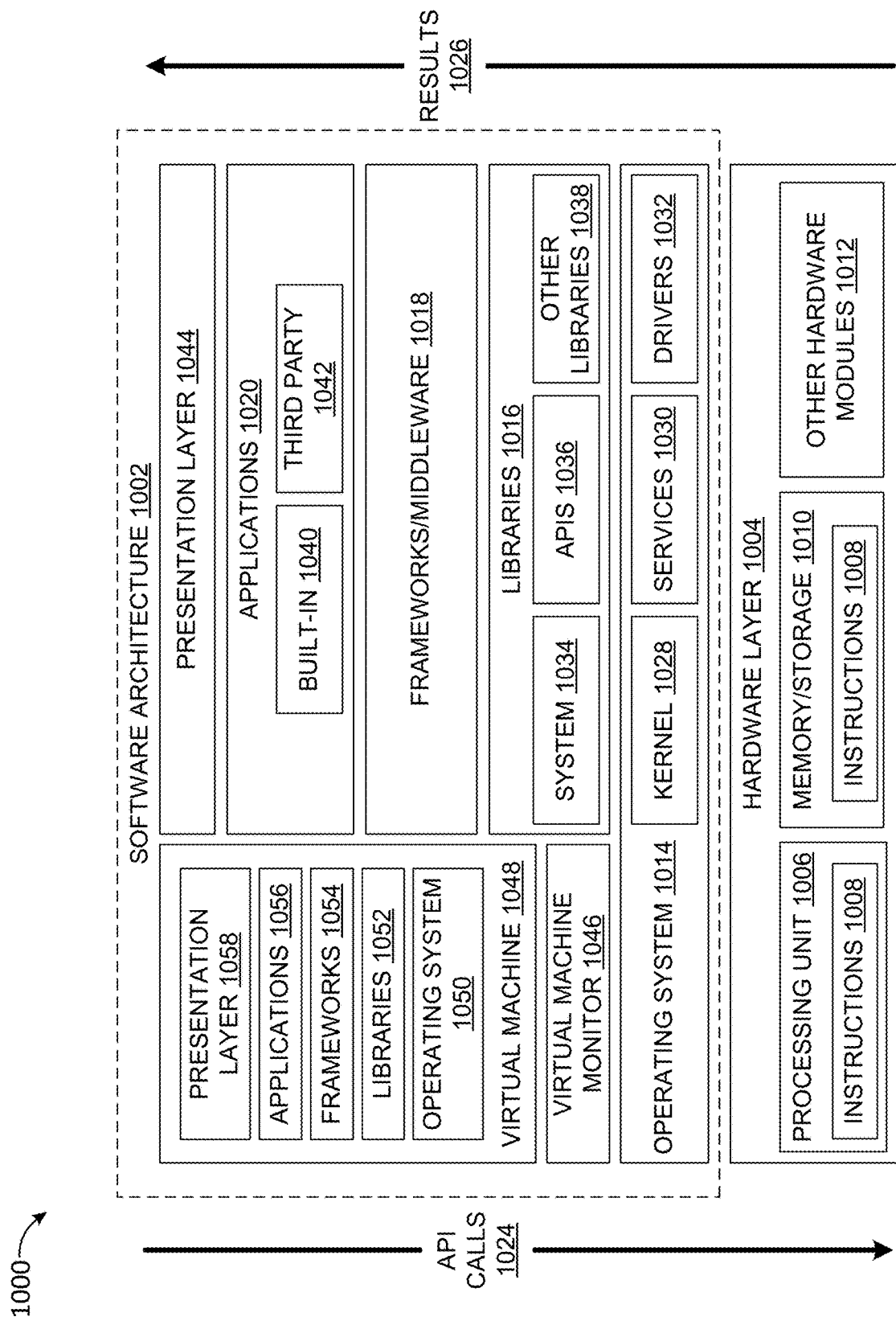
FIG. 10 is a block diagram showing an example software architecture, various portions of which may be used in conjunction with various hardware architectures herein described, which may implement any of the described features.

FIG. 10 is a block diagram 1000 illustrating an example software architecture 1002, various portions of which may be used in conjunction with various hardware architectures herein described, which may implement any of the above-described features. FIG. 10 is a non-limiting example of a software architecture, and it will be appreciated that many other architectures may be implemented to facilitate the functionality described herein. The software architecture 1002 may execute on hardware such as a machine 1100 of FIG. 11 that includes, among other things, processors 1110, memory 1130, and input/output (I/O) components 1150. A representative hardware layer 1004 is illustrated and can represent, for example, the machine 1100 of FIG. 11. The representative hardware layer 1004 includes a processing unit 1006 and associated executable instructions 1008. The executable instructions 1008 represent executable instructions of the software architecture 1002, including implementation of the methods, modules and so forth described herein. The hardware layer 1004 also includes a memory/storage 1010, which also includes the executable instructions 1008 and accompanying data. The hardware layer 1004 may also include other hardware modules 1012. Instructions 1008 held by processing unit 1006 may be portions of instructions 1008 held by the memory/storage 1010.

The example software architecture 1002 may be conceptualized as layers, each providing various functionality. For example, the software architecture 1002 may include layers and components such as an operating system (OS) 1014, libraries 1016, frameworks 1018, applications 1020, and a presentation layer 1044. Operationally, the applications 1020 and/or other components within the layers may invoke API calls 1024 to other layers and receive corresponding results 1026. The layers illustrated are representative in nature and other software architectures may include additional or different layers. For example, some mobile or special purpose operating systems may not provide the frameworks/middleware 1018.

The OS 1014 may manage hardware resources and provide common services. The OS 1014 may include, for example, a kernel 1028, services 1030, and drivers 1032. The kernel 1028 may act as an abstraction layer between the hardware layer 1004 and other software layers. For example, the kernel 1028 may be responsible for memory management, processor management (for example, scheduling), component management, networking, security settings, and so on. The services 1030 may provide other common services for the other software layers. The drivers 1032 may be responsible for controlling or interfacing with the underlying hardware layer 1004. For instance, the drivers 1032 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 1016 may provide a common infrastructure that may be used by the applications 1020 and/or other components and/or layers. The libraries 1016 typically provide functionality for use by other software modules to perform tasks, rather than rather than interacting directly with the OS 1014. The libraries 1016 may include system libraries 1034 (for example, C standard library) that may provide functions such as memory allocation, string manipulation, file operations. In addition, the libraries 1016 may include API libraries 1036 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 1016 may also include a wide variety of other libraries 1038 to provide many functions for applications 1020 and other software modules.

The frameworks 1018 (also sometimes referred to as middleware) provide a higher-level common infrastructure that may be used by the applications 1020 and/or other software modules. For example, the frameworks 1018 may provide various graphic user interface (GUI) functions, high-level resource management, or high-level location services. The frameworks 1018 may provide a broad spectrum of other APIs for applications 1020 and/or other software modules.

The applications 1020 include built-in applications 1040 and/or third-party applications 1042. Examples of built-in applications 1040 may include, but are not limited to, a contacts application, a browser application, a location application, a media application, a messaging application, and/or a game application. Third-party applications 1042 may include any applications developed by an entity other than the vendor of the particular platform. The applications 1020 may use functions available via OS 1014, libraries 1016, frameworks 1018, and presentation layer 1044 to create user interfaces to interact with users.

Some software architectures use virtual machines, as illustrated by a virtual machine 1048. The virtual machine 1048 provides an execution environment where applications/modules can execute as if they were executing on a hardware machine (such as the machine 1100 of FIG. 11, for example). The virtual machine 1048 may be hosted by a host OS (for example, OS 1014) or hypervisor, and may have a virtual machine monitor 1046 which manages operation of the virtual machine 1048 and interoperation with the host operating system. A software architecture, which may be different from software architecture 1002 outside of the virtual machine, executes within the virtual machine 1048 such as an OS 1050, libraries 1052, frameworks 1054, applications 1056, and/or a presentation layer 1058.

Figure 11:
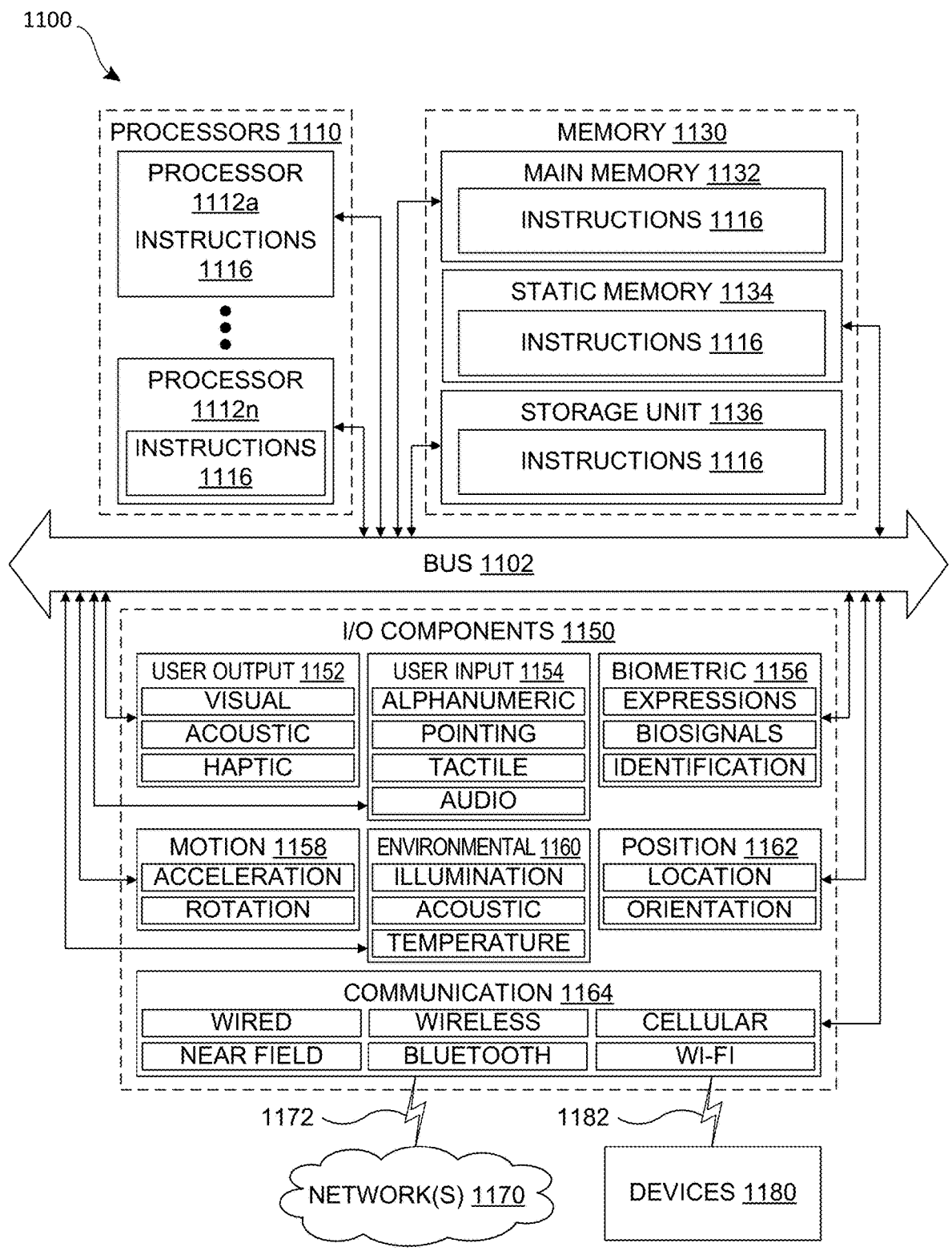
FIG. 11 is a block diagram showing components of an example machine configured to read instructions from a machine-readable medium and perform any of the features described herein.

FIG. 11 is a block diagram illustrating components of an example machine 1100 configured to read instructions from a machine-readable medium (for example, a machine-readable storage medium) and perform any of the features described herein. The example machine 1100 is in a form of a computer system, within which instructions 1116 (for example, in the form of software components) for causing the machine 1100 to perform any of the features described herein may be executed. As such, the instructions 1116 may be used to implement modules or components described herein. The instructions 1116 cause unprogrammed and/or unconfigured machine 1100 to operate as a particular machine configured to carry out the described features. The machine 1100 may be configured to operate as a standalone device or may be coupled (for example, networked) to other machines. In a networked deployment, the machine 1100 may operate in the capacity of a server machine or a client machine in a server-client network environment, or as a node in a peer-to-peer or distributed network environment. Machine 1100 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 1100 is illustrated, the term "machine" includes a collection of machines that individually or jointly execute the instructions 1116.

The machine 1100 may include processors 1110, memory 1130, and I/O components 1150, which may be communicatively coupled via, for example, a bus 1102. The bus 1102 may include multiple buses coupling various elements of machine 1100 via various bus technologies and protocols. In an example, the processors 1110 (including, for example, a central processing unit (CPU), a graphics processing unit (GPU), a digital signal processor (DSP), an ASIC, or a suitable combination thereof) may include one or more processors $1112a$ to $1112n$ that may execute the instructions 1116 and process data. In some examples, one or more processors 1110 may execute instructions provided or identified by one or more other processors 1110. The term "processor" includes a multi-core processor including cores that may execute instructions contemporaneously. Although FIG. 11 shows multiple processors, the machine 1100 may include a single processor with a single core, a single processor with multiple cores (for example, a multi-core processor), multiple processors each with a single core, multiple processors each with multiple cores, or any combination thereof. In some examples, the machine 1100 may include multiple processors distributed among multiple machines.

The memory/storage 1130 may include a main memory 1132, a static memory 1134, or other memory, and a storage unit 1136, both accessible to the processors 1110 such as via the bus 1102. The storage unit 1136 and memory 1132, 1134 store instructions 1116 embodying any one or more of the functions described herein. The memory/storage 1130 may also store temporary, intermediate, and/or long-term data for processors 1110. The instructions 1116 may also reside, completely or partially, within the memory 1132, 1134, within the storage unit 1136, within at least one of the processors 1110 (for example, within a command buffer or cache memory), within memory at least one of I/O components 1150, or any suitable combination thereof, during execution thereof. Accordingly, the memory 1132, 1134, the storage unit 1136, memory in processors 1110, and memory in I/O components 1150 are examples of machine-readable media.

As used herein, "machine-readable medium" refers to a device able to temporarily or permanently store instructions and data that cause machine 1100 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 1116) for execution by a machine 1100 such that the instructions, when executed by one or more processors 1110 of the machine 1100, cause the machine 1100 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 1150 may include a wide variety of hardware components adapted to receive input, provide output, produce output, transmit information, exchange information, capture measurements, and so on. The specific I/O components 1150 included in a particular machine will depend on the type and/or function of the machine. For example, mobile devices such as mobile phones may include a touch input device, whereas a headless server or IoT device may not include such a touch input device. The particular examples of I/O components illustrated in FIG. 11 are in no way limiting, and other types of components may be included in machine 1100. The grouping of I/O components 1150 are merely for simplifying this discussion, and the grouping is in no way limiting. In various examples, the I/O components 1150 may include user output components 1152 and user input components 1154. User output components 1152 may include, for example, display components for displaying information (for example, a liquid crystal display (LCD) or a projector), acoustic components (for example, speakers), haptic components (for example, a vibratory motor or force-feedback device), and/or other signal generators. User input components 1154 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 1150 may include biometric components 1156, motion components 1158, environmental components 1160, and/or position components 1162, among a wide array of other physical sensor components. The biometric components 1156 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 1158 may include, for example, acceleration sensors (for example, an accelerometer) and rotation sensors (for example, a gyroscope). The environmental components 1160 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 1162 may include, for example, location sensors (for example, a Global Position System (GPS) receiver), altitude sensors (for example, an air pressure sensor from which altitude may be derived), and/or orientation sensors (for example, magnetometers).

The I/O components 1150 may include communication components 1164, implementing a wide variety of technologies operable to couple the machine 1100 to network(s) 1170 and/or device(s) 1180 via respective communicative couplings 1172 and 1182. The communication components 1164 may include one or more network interface components or other suitable devices to interface with the network(s) 1170. The communication components 1164 may include, for example, components adapted to provide wired communication, wireless communication, cellular communication, Near Field Communication (NFC), Bluetooth communication, Wi-Fi, and/or communication via other modalities. The device(s) 1180 may include other machines or various peripheral devices (for example, coupled via USB).

In some examples, the communication components 1164 may detect identifiers or include components adapted to detect identifiers. For example, the communication components 1164 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 1162, such as, but not limited to, geo-location via Internet Protocol (IP) address, location via Wi-Fi, cellular, NFC, Bluetooth, or other wireless station identification and/or signal triangulation.

In the preceding detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
    a processor; and
    a machine-readable medium storing executable instructions that, when executed, cause the processor to perform operations comprising:
        generating a first audio stream comprising audio content associated with a game being played on a cloud-based gaming platform, the cloud-based gaming platform being configured to execute the game on a server associated with the cloud-based gaming platform and to output audio and video streams comprising game content;
        generating a second audio stream comprising the audio content associated with the game being played and an acoustic marker inaudible to a human user;
        sending the first audio stream to a controller associated with the cloud-based gaming platform, the controller being associated with a first user, the controller providing a user interface for receiving control commands for the first user, the controller further configured to generate control signals based on the control commands and to send the control signals to the cloud-based gaming platform;
        sending the second audio stream to a display device associated with the first user, the display device comprising a display for presenting video content from video streams received from the cloud-based gaming platform, and a first speaker for presenting audio content from the second audio stream;
        receiving a third audio stream from the controller, the third audio stream being generated based on signals output by a second microphone associated with the controller, the third audio stream including at least the acoustic marker of the second audio stream output by the first speaker of the display device captured by the second microphone;
        receiving timestamp information from the controller indicating when the controller outputs audio frames of the first audio stream via a second speaker associated with the controller;
        analyzing the third audio stream and the timestamp information to determine an inter-stream latency between the first audio stream and the second audio stream, the inter-stream latency representing a difference between latencies experienced by the first audio stream and the second audio stream; and
        adjusting one or more parameters of the first audio stream, the second audio stream, or both to reduce or eliminate the inter-stream latency to synchronize playback of the first audio stream at the controller with the playback of the second audio stream at the display device.

2. The data processing system of claim 1, wherein the second microphone is included in a headset worn by the first user, the headset being connected to the controller via a wired or wireless connection.

3. The data processing system of claim 1, wherein the acoustic marker comprises white noise.

4. The data processing system of claim 1, wherein the acoustic marker comprises a signal that is repeated at know internals in the second audio stream.

5. The data processing system of claim 1, wherein analyzing the third audio stream and the timestamp information to determine the inter-stream latency further comprises correlating the acoustic marker with the third audio stream to identify a first timestamp representing an occurrence of the acoustic marker in the third audio stream.

6. The data processing system of claim 5, wherein the machine-readable medium further includes instructions configured to cause the processor to perform an operation of determining the inter-stream latency by comparing the first timestamp with a second timestamp associated with a corresponding portion of the first audio stream, the second timestamp indicating when the corresponding portion of the first audio stream was output by the second speaker of the controller.

7. The data processing system of claim 1, wherein the machine-readable medium further includes instructions configured to cause the processor to perform an operation of:
    compensating for the inter-stream latency by adding a delay to the first audio stream or the second audio stream or reducing a playback rate of the first audio stream or the second audio stream.

8. The data processing system of claim 1, wherein the machine-readable medium further includes instructions configured to cause the processor to perform operations of:
determining a first clock offset representing a difference between a first clock of the controller and a reference clock of the cloud-based gaming platform;
determining a second clock offset representing a difference between a second clock of the display device and the reference clock of the cloud-based gaming platform;
determining an estimated error based on a first one-way latency estimate associated with the controller and a second one-way latency estimate associated with the display device;
determining an updated first one-way latency estimate and an updated second one-way latency estimate;
determining an estimated inter-stream latency based on the updated first one-way latency estimate, the updated second one-way latency estimate, and the estimated error; and
adjusting one or more parameters of the first audio stream, the second audio stream, or both to reduce or eliminate the estimated inter-stream latency.

9. The data processing system of claim 8, wherein the machine-readable medium further includes instructions configured to cause the processor to perform operations of:
determining the first one-way latency estimate by determining a first difference between a first timestamp indicating a first time at which a first audio frame of the first audio stream is transmitted to the controller by the cloud-based gaming platform and a second timestamp indicating a second time at which the controller plays the first audio frame; and
determining the second one-way latency estimate by determining a second difference between a third timestamp indicating a third time at which a first audio frame of the first audio stream is transmitted to the display device by the cloud-based gaming platform and a fourth timestamp indicating a fourth time at which the display device plays the first audio frame.

10. A data processing system comprising:
a processor; and
a machine-readable medium storing executable instructions that, when executed, cause the processor to perform operations comprising:
receiving a first audio stream at a controller associated with a cloud-based gaming platform, the first audio stream comprising audio content associated with a game being played on a cloud-based gaming platform;
outputting the first audio stream from a first speaker associated with the controller;
generating timestamp information from the controller indicating when the controller outputs audio frames of the first audio stream via the first speaker;
sending the timestamp information to cloud-based gaming platform;
generating a recording of a second audio stream output by a second speaker associated with a display device, the second audio stream including an acoustic marker, the acoustic marker being inaudible to a human user;
sending a third audio stream to the cloud-based gaming platform based on the recording of the second audio stream; and
receiving a control signal from the cloud-based gaming platform to adjust a playback speed of the first audio stream to compensate for an inter-stream delay between the first audio stream and the second audio stream.

11. The data processing system of claim 10, wherein a second microphone is included in a headset worn by the human user, the headset being connected to the controller via a wired or wireless connection.

12. The data processing system of claim 10, wherein the acoustic marker comprises white noise.

13. The data processing system of claim 10, wherein the acoustic marker comprises a signal that is repeated at know internals in the second audio stream.

14. The data processing system of claim 10, wherein the timestamp information associated with an audio frame includes an audio frame identifier and a time at which the audio frame was output by the first speaker associated with the controller.

15. A method implemented in a data processing system for synchronizing audio streams for a cloud-based gaming platform, the method comprising:
generating a first audio stream comprising audio content associated with a game being played on the cloud-based gaming platform, the cloud-based gaming platform being configured to execute the game on a server associated with the cloud-based gaming platform and to output audio and video streams comprising game content;
generating a second audio stream comprising the audio content associated with the game;
generating an encoded second audio stream from the second audio stream by adding an acoustic marker to the second audio stream, the acoustic marker being inaudible to a human user;
sending the first audio stream to a controller associated with the cloud-based gaming platform, the controller being associated with a first user, the controller providing a user interface for receiving control commands for the first user, the controller further configured to generate control signals based on the control commands and to send the control signals to the cloud-based gaming platform;
sending the encoded second audio stream to a display device associated with the first user, the display device comprising a display for presenting video content from video streams received from the cloud-based gaming platform, and a first speaker for presenting audio content from the encoded second audio stream;
receiving a third audio stream from the controller, the third audio stream being generated based on signals output by a second microphone associated with the controller, the third audio stream including at least the acoustic marker of the second audio stream output by the first speaker of the display device captured by the second microphone;
receiving timestamp information from the controller indicating when the controller outputs audio frames of the first audio stream via a second speaker associated with the controller;
analyzing the third audio stream and the timestamp information to determine an inter-stream latency between the first audio stream and the second audio stream, the inter-stream latency representing a difference between latencies experienced by the first audio stream and the second audio stream; and adjusting one or more parameters of the first audio stream, the second audio stream, or both to reduce or eliminate the inter-stream latency to synchronize playback of the first audio stream at the controller with the playback of the second audio stream at the display device.

16. The method of claim 15, wherein the second microphone is included in a headset worn by the first user, the headset being connected to the controller via a wired or wireless connection.

17. The method of claim 15, wherein the acoustic marker comprises white noise.

18. The method of claim 15, wherein the acoustic marker comprises a signal that is repeated at know internals in the second audio stream.

19. The method of claim 15, wherein analyzing the third audio stream and the timestamp information to determine the inter-stream latency further comprises correlating the acoustic marker with the third audio stream to identify a first timestamp representing an occurrence of the acoustic marker in the third audio stream.

20. The method of claim 19, further comprising determining the inter-stream latency by comparing the first timestamp with a second timestamp associated with a corresponding portion of the first audio stream, the second timestamp indicating when the corresponding portion of the first audio stream was output by the second speaker of the controller.

* * * * *